US012596287B2

(12) United States Patent
Kikukawa et al.

(10) Patent No.: US 12,596,287 B2
(45) Date of Patent: Apr. 7, 2026

(54) VISIBLE LIGHT MODULATION DEVICE AND OPTICAL ENGINE INCLUDING THE SAME

(71) Applicant: TDK CORPORATION, Tokyo (JP)

(72) Inventors: Takashi Kikukawa, Tokyo (JP); Tsuyoshi Komaki, Tokyo (JP); Hideaki Fukuzawa, Tokyo (JP); Hiroki Hara, Tokyo (JP)

(73) Assignee: TDK CORPORATION, Tokyo (JP)

( * ) Notice: Subject to any disclaimer, the term of this patent is extended or adjusted under 35 U.S.C. 154(b) by 574 days.

(21) Appl. No.: 18/018,387

(22) PCT Filed: Jul. 30, 2021

(86) PCT No.: PCT/JP2021/028521
§ 371 (c)(1),
(2) Date: Jan. 27, 2023

(87) PCT Pub. No.: WO2023/007753
PCT Pub. Date: Feb. 2, 2023

(65) Prior Publication Data
US 2024/0255828 A1 Aug. 1, 2024

(51) Int. Cl.
*G02F 1/225* (2006.01)
*G02F 1/035* (2006.01)
*G02F 1/21* (2006.01)

(52) U.S. Cl.
CPC ............ *G02F 1/2255* (2013.01); *G02F 1/212* (2021.01); *G02F 1/035* (2013.01)

(58) Field of Classification Search
CPC ..... G02F 1/21; G02F 1/13; G02F 1/31; G02F 1/0121; G02F 1/225; G02F 1/313; G02F 1/365; G02F 1/212; G02F 2201/58; G02F 2001/212; G02F 1/2255; G02F 1/035; G02F 1/05; G02B 6/10; G02B 6/136; G02B 6/132; G02B 6/1345; G02B 6/125; G02B 6/26; G02B 6/12007
USPC ....... 359/279, 245, 248, 315, 578, 579, 583; 385/2–4, 14, 32, 129, 131
See application file for complete search history.

(56) References Cited

U.S. PATENT DOCUMENTS

| | | | |
|---|---|---|---|
| 5,802,222 A | 9/1998 | Rasch et al. | |
| 2006/0110089 A1 | 5/2006 | Ichikawa et al. | |
| 2017/0052423 A1 | 2/2017 | Okamoto | |
| 2020/0272020 A1 | 8/2020 | Ohmori et al. | |
| 2021/0255489 A1* | 8/2021 | Wang .................... | G02F 1/0018 |

FOREIGN PATENT DOCUMENTS

| | | |
|---|---|---|
| JP | H07-064034 A | 3/1995 |
| JP | H09-512353 A | 12/1997 |
| JP | 2004-093905 A | 3/2004 |

(Continued)

*Primary Examiner* — Jie Lei
(74) *Attorney, Agent, or Firm* — Oliff PLC

(57) ABSTRACT

A visible light modulation device includes a light source part having a plurality of optical semiconductor devices configured to emit light with a visible light wavelength of 400 nm to 700 nm, and a light modulation output part having three Mach-Zehnder type optical waveguides consisting of a convex fabricated lithium niobate film, and being configured so that light emitted from each of the plurality of optical semiconductor devices is incident on the corresponding Mach-Zehnder type optical waveguide.

19 Claims, 22 Drawing Sheets

(56)                    References Cited

FOREIGN PATENT DOCUMENTS

| JP | 2005-189385 | A  | 7/2005 |
|----|-------------|----|--------|
| JP | 2017-040886 | A  | 2/2017 |
| JP | 6728596     | B2 | 7/2020 |
| JP | 2020-134875 | A  | 8/2020 |
| JP | 2021-086976 | A  | 6/2021 |
| WO | 2021/140752 | A1 | 7/2021 |

* cited by examiner

VISIBLE LIGHT MODULATION DEVICE AND OPTICAL ENGINE INCLUDING THE SAME

TECHNICAL FIELD

The present invention relates to a visible light modulation device and an optical engine including the same.

BACKGROUND ART

An augmented reality (AR) glass and a virtual reality (VR) glass are anticipated as small wearable devices. In such a device, a light-emitting device that emits full-color visible lights is one of the crucial devices for drawing high-quality images. In such a device, for example, the light emitting device expresses a moving image in desired colors by modulating intensity of each of three colors of RGB that express visible light at a high speed independently.

As such a light emitting device, Patent Literature 1 discloses a light emitting device configured to project a color moving image by causing a laser of visible light to enter a waveguide and controlling emission intensity of a laser chip of each color using current. In addition, Patent Literature 2 discloses a modulator configured to independently modulate intensity of each of three colors of RGB using an external modulator by causing a laser beam to enter the external modulator having a waveguide formed in a substrate having an electro-optic effect via an optical fiber.

In a wearable device such as an AR glass or a VR glass, a key to popularization of the light emitting module is miniaturization such that each function fits within a size of a conventional spectacle type.

CITATION LIST

Patent Literature

Patent Literature 1
    Japanese Unexamined Patent Application, First Publication No. 2021-86976
Patent Literature 2
    Japanese Patent No. 6728596

SUMMARY OF INVENTION

Technical Problem

In the light emitting device disclosed in Patent Literature 1, while emission intensity of a laser is directly controlled by current in current control, it is necessary to control the current in a linear region of a current-optical output graph in order to secure stability of the emission intensity, in current control. For this reason, there is a problem that power consumption is great and is difficult to reduce.

In addition, Patent Literature 2 discloses an optical modulator in which an optical waveguide is provided on a substrate formed of materials such as lithium niobate, lithium tantalite, lead lanthanum zirconate titanate, potassium phosphate titanate, polythiophene, a liquid crystal material, and various induced polymers, which have electro-optic effects. An aspect in which a part of a single crystal or a solid solution crystal, particularly of lithium niobate among these, is modified by a proton exchange method or a Ti diffusion method to form an optical waveguide, is disclosed as a preferred aspect. However, since a size of the modified waveguide portion (core) region is defined by a distance where a proton or Ti is introduced and diffused, it is difficult to reduce a diameter of the optical waveguide. For this reason, since the size of the optical waveguide itself must be large, it is difficult to concentrate an electric field of a modulation voltage due to a large diameter of the optical waveguide, it is necessary to apply a large voltage for modulation, or it is necessary to lengthen the electrode to which the voltage is applied to operate the electrode with a small voltage, the size of the device becomes large.

In addition, in a modulator shown in FIG. 28($a$) in which a portion B1-$a$ in which a part of a single crystal B1 of bulk lithium niobate is modified is used as an optical waveguide, since a small amount of Ti is added to the bulk lithium niobate single crystal to create a refractive index difference Δn, a refractive index difference between a modified waveguide portion (core) and a non-modified portion (cladding) is small. For this reason, since a bending loss caused by curving the optical waveguide is large and the optical waveguide cannot be curved with a high curvature, it is difficult to reduce the size of the device. In addition, in a modulation light source mounted on a head mount display such as an AR glass or the like, for example, while a size that fits within a string size of spectacles is required, it is difficult to fabricate an optical modulator miniaturized to such a size in the bulk crystal type optical modulator disclosed in Patent Literature 2.

A modulator, in which a convex section Fridge obtained by processing a single crystal lithium niobate film F epitaxially grown on a substrate such as sapphire or the like as shown in FIG. 28($b$) is used as an optical waveguide, is known in comparison with the modulator in which the portion B1-$a$ obtained by modifying a part of the single crystal B1 of lithium niobate is used as the optical waveguide. The modulator is suitable for miniaturization for reasons such as the size of the convex portion being smaller than that of the Ti diffusion optical waveguide, the fact that the refractive index difference Δn can be increased when surrounding materials are selected appropriately because the entire area around the convex part corresponds to the cladding, and the optical loss when the optical waveguide is curved being smaller than that of the bulk lithium niobate single crystal.

In addition, FIG. 7 of Patent Literature 2 discloses an optical module 100 in which a light source part 311 and a modulator 30 are provided as a module that is a configuration unit, the light source part 311 is not directly modulated, and light externally modulated by the modulator 30 can be emitted. Like the optical module 100 disclosed in Patent Literature 2, when the optical module having the configuration multiplexed after laser beams of red (R), green (G) and blue (G) are output from the modulator 30 is used as a component of an optical engine, since the optical system becomes large as will be described below, it is difficult to reduce the size of the optical engine.

In consideration of the above-mentioned circumstances, the present inventors came up with the present invention as a result of giving top priority to achieving miniaturization to the extent that it can be mounted on AR glass, VR glass, or the like.

In consideration of the above-mentioned problems, the present invention is directed to providing a visible light modulation device, which has a small size that can be mounted on AR glass, VR glass, or the like, and an optical engine including the same.

Solution to Problem

In order to solve the above-mentioned problems, the present invention provides the following means.

A visible light modulation device according to a first aspect of the present invention includes a light source part having a plurality of optical semiconductor devices configured to emit light with a visible light wavelength of 400 nm to 700 nm; and a light modulation output part having a plurality of Mach-Zehnder type optical waveguides consisting of a convex fabricated lithium niobate film, and being configured so that light emitted from each of the multiple optical semiconductor devices is incident on the corresponding Mach-Zehnder type optical waveguide.

In the visible light modulation device according to the above-mentioned aspect, the wavelengths of the light emitted from the plurality of optical semiconductor devices may be all different from each other.

In the visible light modulation device according to the above-mentioned aspect, the Mach-Zehnder type optical waveguide may have a curved part.

In the visible light modulation device according to the above-mentioned aspect, a base on which the plurality of optical semiconductor devices are mounted and a substrate on which the Mach-Zehnder type optical waveguides are formed may be directly bonded to each other via a metal layer.

In the visible light modulation device according to the above-mentioned aspect, a gap may be provided between an emission surface from which light is emitted from the optical semiconductor device and an incidence surface of the light modulation output part, and the corresponding optical semiconductor device and the Mach-Zehnder type optical waveguide may be positioned such that the light from the optical semiconductor device is emitted from the emission surface, propagates through the gap and enters the Mach-Zehnder type optical waveguide of the incidence surface.

In the visible light modulation device according to the above-mentioned aspect, the light modulation output part may have a multiplexing part configured to multiplex modulation light from the plurality of Mach-Zehnder type optical waveguides.

In the visible light modulation device according to the above-mentioned aspect, the multiplexing part may be any one selected from the group consisting of an MMI type multiplexer, a Y type multiplexer, and a directional coupler.

The visible light modulation device according to the above-mentioned aspect may include a controller configured to control a current value input to each of the plurality of optical semiconductor devices such that a peak output of each wavelength of the light emitted to the outside through the plurality of Mach-Zehnder type optical waveguides has a predetermined ratio.

In the visible light modulation device according to the above-mentioned aspect, a current value input to each of the plurality of optical semiconductor devices may be a constant value, and the plurality of Mach-Zehnder type optical waveguides may be configured such that a peak output of each wavelength of the light emitted to the outside through the plurality of Mach-Zehnder type optical waveguides has a predetermined ratio.

In the visible light modulation device according to the above-mentioned aspect, a length of an optical waveguide from an incident end to an output end of the plurality of Mach-Zehnder type optical waveguides may be as short as the Mach-Zehnder type optical waveguide through which light with a small wavelength propagates.

The visible light modulation device according to the aspect may include a light absorption part formed of a material that is absorptive for a wavelength of the light propagating through the optical waveguide from the incident end to the output end of the plurality of Mach-Zehnder type optical waveguides, and a length of the optical waveguide of the light absorption part in a length direction may be as short as the Mach-Zehnder type optical waveguide through which the light with a small wavelength propagates.

The visible light modulation device according to the above-mentioned aspect may include a curved part having a curvature provided in the optical waveguide from the incident end to the output end in each of the plurality of Mach-Zehnder type optical waveguides, and the Mach-Zehnder type optical waveguide through which the light with a small wavelength propagates may have a large curvature or the curved part may have a small length.

In the visible light modulation device according to the above-mentioned aspect, the peak output of each wavelength of the light emitted to the outside through the plurality of Mach-Zehnder type optical waveguides may have the same intensity.

The visible light modulation device according to the above-mentioned aspect may include a light absorption layer having a groove section reaching a substrate on which the Mach-Zehnder type optical waveguide is formed from a surface of a device in a portion of the light modulation output part other than the Mach-Zehnder type optical waveguide, and provided on at least a bottom surface and side surfaces of the groove section.

In the visible light modulation device according to the above-mentioned aspect, the light absorption layer may be formed to fill the entire groove section.

In the visible light modulation device according to the above-mentioned aspect, the plurality of groove sections may be formed to be separated from each other along one surface of the substrate.

In the visible light modulation device according to the above-mentioned aspect, the optical waveguide may have a curved section curved from a straight section, and the groove sections may be disposed t in a manner of intersecting a virtual extension line of the straight section.

In the visible light modulation device according to the above-mentioned aspect, the optical waveguide may have a curved section curved from a straight section, and the groove sections may be formed in a manner of being curved and extending along the curved section.

A visible light modulation device according to a second aspect of the present invention includes a light source part having a plurality of optical semiconductor devices configured to emit light with a visible light wavelength of 400 nm to 700 nm; and a light modulation output part having a plurality of Mach-Zehnder type optical waveguides consisting of a convex fabricated lithium niobate film and being configured so that light emitted from each of the plurality of optical semiconductor devices is incident on the corresponding Mach-Zehnder type optical waveguide, and having a multiplexing part configured to multiplex modulation light from the plurality of Mach-Zehnder type optical waveguides.

In the visible light modulation device according to the above-mentioned aspect, wavelengths of light emitted from the plurality of optical semiconductor devices may be all different from each other.

In the visible light modulation device according to the above-mentioned aspect, the Mach-Zehnder type optical waveguide may have a curved section.

In the visible light modulation device according to the above-mentioned aspect, a base on which the plurality of optical semiconductor devices are mounted and a substrate on which the Mach-Zehnder type optical waveguides are formed may be directly bonded to each other via a metal layer.

In the visible light modulation device according to the above-mentioned aspect, a gap may be provided between an emission surface from which light from the optical semiconductor device is emitted and an incidence surface of the light modulation output part, and the corresponding semiconductor device and the Mach-Zehnder type optical waveguide may be positioned such that the light from the optical semiconductor device is emitted from the emission surface, propagates through the gap and enters the Mach-Zehnder type optical waveguide of the incidence surface.

In the visible light modulation device according to the above-mentioned aspect, the multiplexing part may be any one selected from the group consisting of an MMI type multiplexer, a Y type multiplexer, and a directional coupler.

The visible light modulation device according to the above-mentioned aspect may include a controller configured to control a current value input to each of the plurality of optical semiconductor devices such that a peak output of each wavelength of the light emitted to the outside through the plurality of Mach-Zehnder type optical waveguides has a predetermined ratio.

In the visible light modulation device according to the above-mentioned aspect, a current value input to each of the plurality of optical semiconductor devices may have a constant value, and the plurality of Mach-Zehnder type optical waveguides may be configured such that a peak output of each wavelength of the light emitted to the outside through the plurality of Mach-Zehnder type optical waveguides has a predetermined ratio.

In the visible light modulation device according to the above-mentioned aspect, a length of an optical waveguide from an incident end to an output end of the plurality of Mach-Zehnder type optical waveguides may be as short as the Mach-Zehnder type optical waveguide through which the light with a short wavelength propagates.

The visible light modulation device according to the above-mentioned aspect may include a light absorption part formed of a material that is absorptive for a wavelength of the light propagating through the optical waveguide from the incident end to the output end in each of the plurality of Mach-Zehnder type optical waveguides, and a length of the optical waveguide of the light absorption part in the length direction may be as short as the Mach-Zehnder type optical waveguide through which the light with a small wavelength propagates.

The visible light modulation device according to the above-mentioned aspect may include a curved part having a curvature in the optical waveguide from the incident end to the output end in each of the plurality of Mach-Zehnder type optical waveguides, and the Mach-Zehnder type optical waveguide through which the light with a short wavelength propagates may have a large curvature or the curved part may have a short length.

In the visible light modulation device according to the above-mentioned aspect, a peak output of each wavelength of the light emitted to the outside through the plurality of Mach-Zehnder type optical waveguides may have the same intensity.

The visible light modulation device according to the above-mentioned aspect may include a light absorption layer having a groove section reaching a substrate on which the Mach-Zehnder type optical waveguide is formed from a surface of a device in a portion of the light modulation output part except the Mach-Zehnder type optical waveguide, and provided on at least a bottom surface and side surfaces of the groove section.

In the visible light modulation device according to the above-mentioned aspect, the light absorption layer may be formed to fill the entire groove section.

In the visible light modulation device according to the above-mentioned aspect, the plurality of groove sections may be formed on one surface of the substrate to be separated from each other.

In the visible light modulation device according to the above-mentioned aspect, the optical waveguide may have a curved section curved from a straight section, and the groove sections may be disposed in a manner of intersecting a virtual extension line of the straight section.

In the visible light modulation device according to the above-mentioned aspect, the optical waveguide may have a curved section curved from a straight section, and the groove sections may be formed in a manner of being curved and extending along the curved section.

An optical engine according to a third aspect of the present invention includes the visible light modulation device according to the above-mentioned aspect; and an optical scanning mirror configured to reflect light emitted from the visible light modulation device to display an image by changing an angle thereof.

Advantageous Effects of Invention

According to the visible light modulation device of the present invention, it is possible to provide a visible light modulation device, which has a small size that can be mounted on AR glass, VR glass, or the like.

BRIEF DESCRIPTION OF DRAWINGS

FIG. 22 is a plan view schematically showing a visible light modulation device according to a second embodiment.

FIG. 26 is a view schematically showing a Mach-Zehnder type optical waveguide of an example, FIG. 26A is a cross-sectional view.

DESCRIPTION OF EMBODIMENTS

Figure 1:
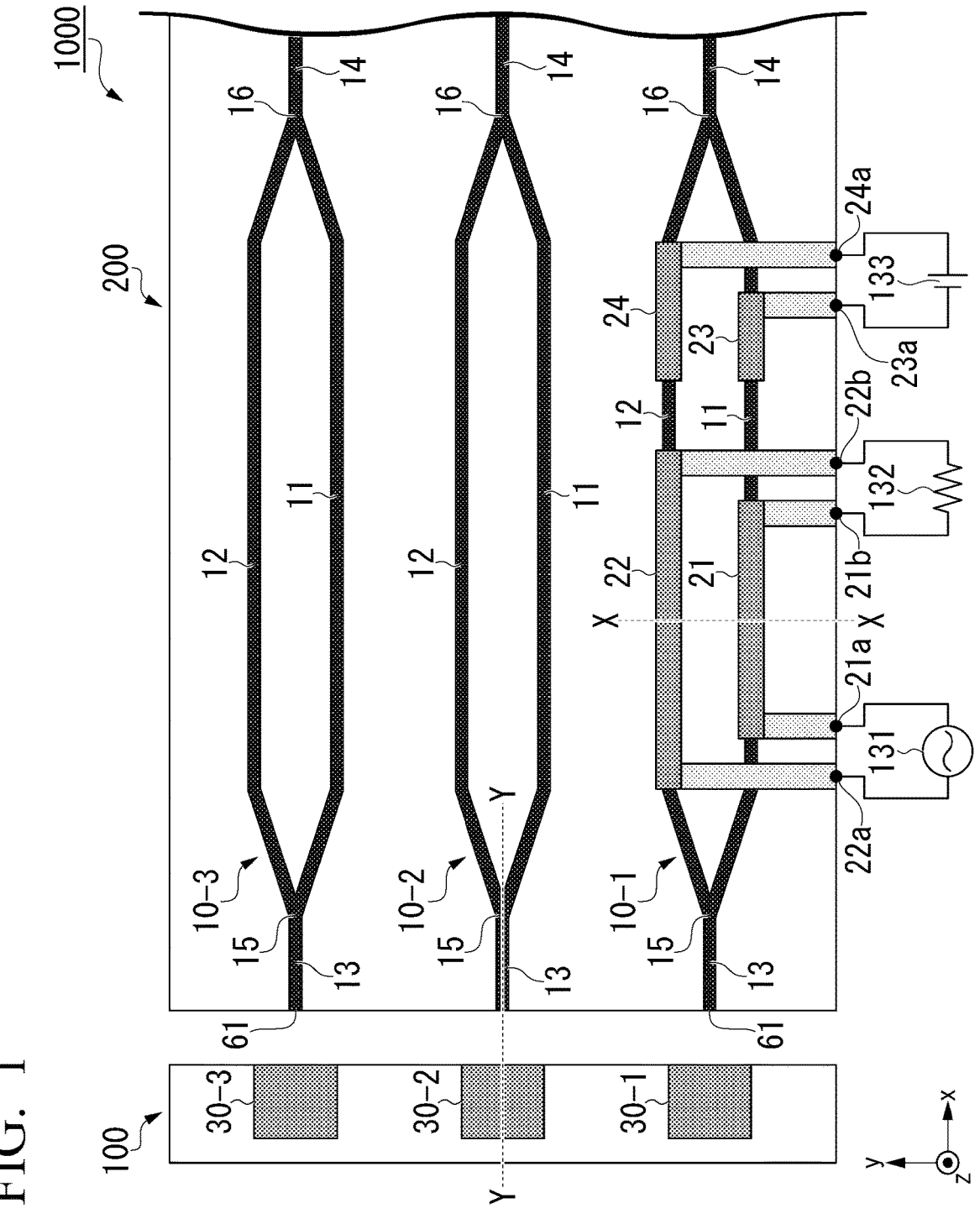
FIG. 1 is a plan view schematically showing a visible light modulation device according to a first embodiment.

Hereinafter, the present invention will be described in detail with reference to the accompanying drawings. In the drawings used in the following description, in order to make it easier to understand the features of the present invention, the characteristic portions may be enlarged for convenience, and dimensional ratios or the like of the components may differ from the actual ones. The materials, dimensions, or the like, exemplified in the following description are examples, and the present invention is not limited thereto and may be implemented with appropriate changes without departing from the spirit of the present invention.

Figure 2:
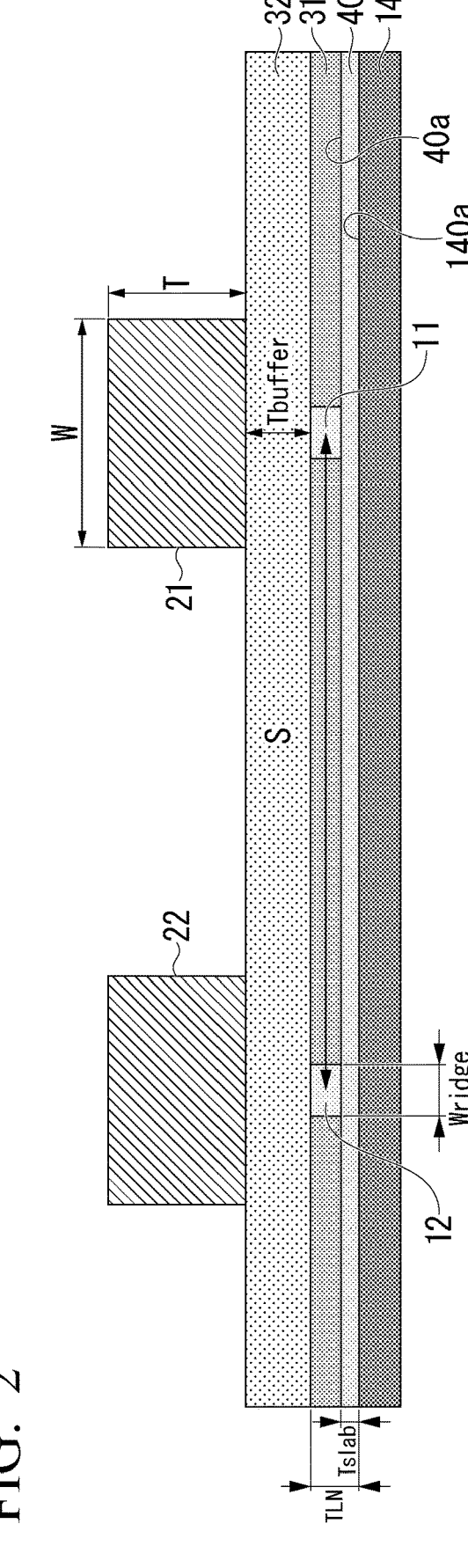
FIG. 2 is a schematic cross-sectional view along line X-X in FIG. 1.
Figure 3:
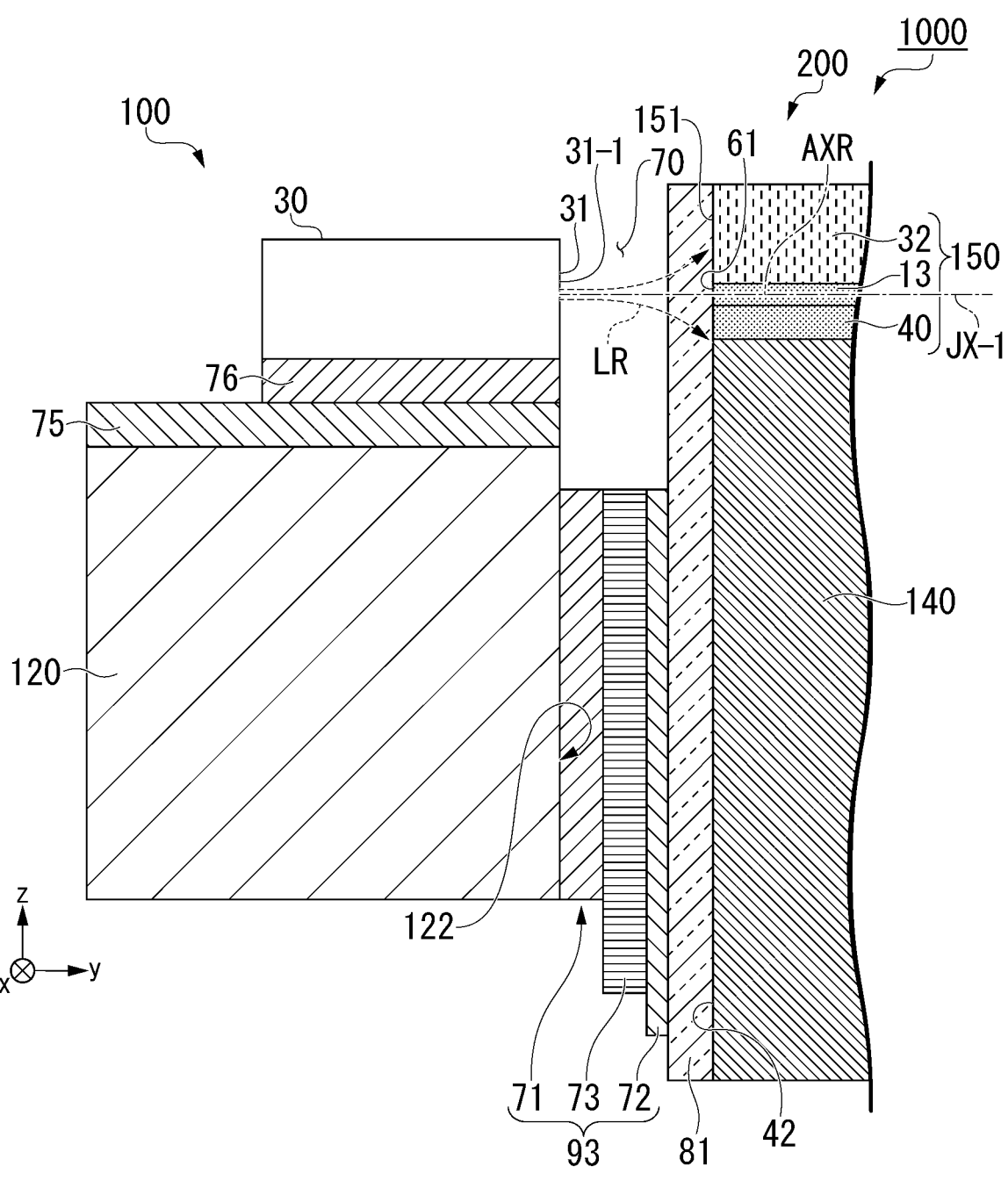
FIG. 3 is a schematic cross-sectional view along line Y-Y in FIG. 1.

FIG. 1 is a plan view schematically showing a visible light modulation device according to the embodiment. In FIG. 1, an electrode configured to apply a phase difference to a Mach-Zehnder type optical waveguide is only partially drawn. FIG. 2 is schematic cross-sectional view along line X-X in FIG. 1. FIG. 3 is schematic cross-sectional view along line Y-Y in FIG. 1.

Visible Light Modulation Device (First Embodiment)

A visible light modulation device 1000 shown in FIG. 1 includes a light source part 100 having three optical semiconductor devices 30-1, 30-2 and 30-3 configured to emit light with a visible light wavelength of 400 nm to 700 nm (hereinafter, may be collectively referred to as "the optical semiconductor device 30"), and a light modulation output part 200 having three Mach-Zehnder type optical waveguides 10-1, 10-2 and 10-3 (hereinafter, may be collectively referred to as "the Mach-Zehnder type optical waveguide 10") corresponding to the three optical semiconductor devices 30-1, 30-2 and 30-3, respectively, into which light emitted from the optical semiconductor devices 30-1, 30-2 and 30-3 enters, and formed by processing a lithium niobate film in a convex shape.

In addition, the optical semiconductor devices 30-1, 30-2 and 30-3 are mounted on a sub-carrier (base) 120, and the Mach-Zehnder type optical waveguides 10-1, 10-2 and 10-3 are formed on a substrate 140.

In the visible light modulation device 1000, by using the optical waveguide obtained by processing the single crystal lithium niobate thin film in a convex shape, the size of the optical waveguide can be reduced to 1 mm or less, and the visible light modulation device can be reduced in size. In addition, since an extremely highly insulated external modulator is controlled by a voltage, it requires very little current for intensity modulation, and has low power consumption because it operates with the minimum current required for laser emission.

In terms of miniaturization, further, in comparison with the case in which the bulk lithium niobate single crystal is used when the optical waveguide is fabricated, advantages of using the lithium niobate film when the optical waveguide is fabricated will be described.

When the bulk lithium niobate single crystal is used to fabricate the optical waveguide, the Ti diffusion waveguide diffuses Ti in the bulk lithium niobate single crystal, and a portion with a higher refractive index than the original single crystal therearound is fabricated. On the other hand, in the case in which the lithium niobate film is used to fabricate the optical waveguide, the lithium niobate film is processed to fabricate a convex portion that becomes the optical waveguide. The convex portion is smaller than the Ti diffusion waveguide.

Further, when the bulk lithium niobate single crystal is used, the refractive index difference $\Delta n$ between the Ti diffusion waveguide (core) and the single crystal portion (cladding) therearound is small. This is because a small amount of Ti is added into the bulk lithium niobate single crystal to fabricate the refractive index difference $\Delta n$. On the other hand, when the lithium niobate film is used, since the entire area around the convex part (core) corresponds to the cladding, the refractive index difference, $\Delta n$, can be increased when the surrounding materials (the side and top materials of the sapphire substrate and the waveguide) are properly selected. As a result, the optical waveguide can be curved with high curvature, and the size in the longitudinal direction can be reduced by the curve. Further, since an interaction length can be increased while keeping the size in the longitudinal direction small, a driving voltage can be lowered.

(Optical Semiconductor Device)

As the optical semiconductor device 30, various types of laser devices can be used. For example, laser diodes (LDs) of red light, green light, blue light, and the like, which are commercially available, can be used. Light with a peak wavelength of 610 nm or more and 750 nm or less can be used for the red light, light with a peak wavelength of 500 nm or more and 560 nm or less can be used for the green light, and light with a peak wavelength of 435 nm or more and 480 nm or less can be used for the blue light.

In the visible light modulation device 1000 shown in FIG. 1, the optical semiconductor devices 30-1, 30-2 and 30-3 are referred to as an LD configured to emit blue light, an LD configured to emit green light, and an LD configured to emit red light, respectively. The LDs 30-1, 30-2 and 30-3 are disposed at intervals in a direction substantially perpendicular to an emission direction of the light emitted from each of the LDs, and provided on an upper surface 121 of the sub-carrier 120. Hereinafter, regarding reference sign Z of an arbitrary component, contents common to components of reference signs Z-1, Z-2, . . . , Z-K may be collectively described as reference sign Z. The above-mentioned K is a natural number of 2 or more.

In the visible light modulation device 1000 shown in FIG. 1, while the case in which the number of the optical semiconductor devices is three has been shown, it is not limited to three and may be plural such as two, or four or more. The plurality of optical semiconductor devices may all emit light with different wavelengths, or may be optical semiconductor devices that emit light with the same wavelength. In addition, light other than red (R), green (G) and blue (B) can also be used for the emitting light, and an order of installation of red (R), green (G), blue (B) described using the drawings also need not to be this order and may be changed as appropriate.

The LD 30 can be mounted on the sub-carrier 120 with a bare chip. The sub-carrier 120 is formed of, for example, aluminum nitride (AlN), aluminum oxide ($Al_2O_3$), silicon (Si), or the like. As shown in FIG. 3, metal layers 75 and 76 are provided between the sub-carrier 120 and the LD 30. The sub-carrier 120 and the LD 30 are connected via the metal layers 75 and 76. A method of forming the metal layers 75 and 76 is not particularly limited and any known method can be used, and a known method such as sputtering, deposition, application of paste metal, or the like, can be used. The metal layers 75 and 76 may include one or a plurality of metals selected from the group consisting of, for example, gold (Au), platinum (Pt), silver (Ag), lead (Pb), indium (In), nickel (Ni), titanium (Ti), tantalum (Ta), a tungsten (W), gold (Au) and tin (Sn) alloy, a tin (Sn)-silver (Ag)-copper (Cu)-based solder alloy (SAC), SnCu, InBi, SnPdAg, SnBiIn and PbBiIn, or may be formed of one or a plurality of metals selected from the group.

While the substrate 140 is not particularly limited as long as a refractive index is lower than a lithium niobate film constituting the Mach-Zehnder type optical waveguide, a substrate that allows a single crystal lithium niobate films to be formed as an epitaxial film is preferable, and a sapphire single crystal substrate or a silicon single crystal substrate is preferable. While a crystal orientation of the single crystal substrate is not particularly limited, for example, since a c-axis oriented lithium niobate film has a 3-fold symmetry property, it is desirable that the underlying single crystal substrate also has the same symmetry property, a c-plane substrate is preferable for a sapphire single crystal substrate, and a (111) plate substrate is preferable for a silicon single crystal substrate.

As shown in FIG. 3, a light incident port 61 of an incident portion 13 of each of the Mach-Zehnder type optical waveguides 10 faces an emission port 31-1 of each of the LDs 30, light emitted from an emission surface 31 of the LD 30 is positioned to enter the incident portion 13. An axis JX-1 of the incident portion 13 substantially overlaps an optical axis AXR of a laser beam LR emitted from the emission port 31-1 of the LD 30. The blue light, green light and red light emitted from the LDs 30-1, 30-2 and 30-3 according to such configuration and disposition can enter the incident portion 13 of each of the Mach-Zehnder type optical waveguides 10.

As shown in FIG. 3, the sub-carrier 120 can be directly bonded to the substrate 140 via a metal layer 93 (a first metal layer 71, a second metal layer 72, and a third metal layer 73). According to the configuration, further miniaturization is possible by eliminating spatial coupling or fiber coupling.

In the embodiment, a side surface (a first side surface) 122 facing the substrate 140 in the sub-carrier 120 and a side surface (a second side surface) 42 facing the sub-carrier 120 in the substrate 140 are connected via the first metal layer 71, the second metal layer 72, the third metal layer 73, and an anti-reflection film 81. A melting point of the metal layer 75 is higher than a melting point of the third metal layer 73.

The first metal layer 71 is provided while abutting the side surface 122 through sputtering, deposition, or the like, may include one or a plurality of metals selected from the group consisting of, for example, gold (Au), platinum (Pt), silver (Ag), lead (Pb), indium (In), nickel (Ni), titanium (Ti) and tantalum (Ta), and may be formed of one or a plurality of metals selected from the group. Preferably, the first metal layer 71 includes at least one metal selected from the group consisting of gold (Au), platinum (Pt), silver (Ag), lead (Pb), indium (In), and nickel (Ni). The second metal layer 72 is provided while abutting the side surface 42 through sputtering, deposition, or the like, may include one or a plurality of metals selected from the group consisting of, for example, titanium (Ti), tantalum (Ta) and tungsten (W), and may be formed of one or a plurality of metals selected from the group. Preferably, tantalum (Ta) is used in the second metal layer 72. The third metal layer 73 is interposed between the first metal layer 71 and the second metal layer 72, may include one or a plurality of metals selected from the group consisting of, for example, aluminum (Al), copper (Cu), AuSn, SnCu, InBi, SnAgCu, SnPdAg, SnBiIn and PbBiIn, and may be formed of one or a plurality of metals selected from the group. Preferably, AuSn, SnAgCu, and SnBiIn are used in the third metal layer 73.

A thickness of the first metal layer 71, i.e., a size of the first metal layer 71 in the y direction is, for example, 0.01 µm or more and 5.00 µm or less. A thickness of the second metal layer 72, i.e., a size of the second metal layer 72 in the y direction is, for example, 0.01 µm or more and 1.00 µm or less. A thickness of the third metal layer 73, i.e., a size in the y direction is, for example, 0.01 µm or more and 5.00 µm or less. In addition, a thickness of the third metal layer 73 is preferably greater than a thickness of each of the first metal layer 71 and the second metal layer 72. In such a configuration, the above-mentioned roles of the first metal layer 71, the second metal layer 72, and the third metal layer 73 are expressed well, and intrusion of the material of the first metal layer 71 into the substrate 40 and a decrease in adhesion strength of the metal layers are suppressed. A thickness of the first metal layer 71, the second metal layer 72 and the third metal layer 73 is measured by, for example, spectral ellipsometry.

The first metal layer 71 is provided on a side surface facing the substrate 140 or a light modulation structure layer 150 in the substantially entire region of the side surface 122 while not coming into contact with the metal layer 75. For example, a front end of the second metal layer 72 and the third metal layer 73 in the z direction, i.e., an upper end reaches the same position as the upper end of the first metal layer 71 on a front side in the z direction. For example, a rear end of the second metal layer 72 and the third metal layer 73 in the z direction, i.e., a lower end reaches the same position as the lower end of the sub-carrier 20, the first metal layer 71 and the substrate 140. When seen in the y direction, the first metal layer 71 in the x direction is formed larger than the sub-carrier 20.

Like the above-mentioned configuration, an area of the first metal layer 71, i.e., a size including a plane including the x direction and the z direction is substantially the same as the area of the second metal layer 72 and the third metal layer 73, and a lower end thereof preferably reaches the same position as the lower end of the sub-carrier 120. In such a configuration, a connecting strength of the sub-carrier 120 with respect to the substrate 140 is maximally secured. That is, for example, even when each of the LD 30 and the sub-carrier 120 and an internal electrode pad corresponding to each of the LDs 30 of the plurality of internal electrodes are connected by a wire through wire bonding, release of the connection of the sub-carrier 120 and the substrate 140 can be suppressed. In addition, when a lower end of the sub-carrier 20, the first metal layer 71, the second metal layer 72, the third metal layer 73 and the substrate 140 reaches the same position, heat radiation pass from the sub-carrier 120 can be increased. Further, the area of the first metal layer 71 may be smaller than the area of the second metal layer 72 and the third metal layer 73.

In the visible light modulation device 1000, the anti-reflection film 81 is provided between the LD 30 and the light modulation structure layer 150. For example, the anti-reflection film 81 is formed integrally with the side surface 42 of the substrate 140 and an incidence surface 151 of the light modulation structure layer 150. However, the anti-reflection film 81 may be formed only on the incidence surface 151 of the light modulation structure layer 150.

The anti-reflection film 81 is a film configured to prevent the incidence light into the light modulation structure layer 150 from being reflected in a direction opposite to a direction in which the light enters from the incidence surface 151 and increase transmissivity of the incidence light. The anti-reflection film 81 is a multi-layer film formed by alternately laminating, for example a plurality of types of dielectric substances with predetermined thicknesses according to wavelengths of the red light, green light and blue light that are incidence lights. As the above-mentioned dielectric substance, for example, titanium oxide ($TiO_2$), tantalum oxide ($Ta_2O_5$), silicon oxide ($SiO_2$), aluminum oxide ($Al_2O_3$), or the like, is exemplified.

The emission surface 31 of the LD 30 and the incidence surface 151 of the light modulation structure layer 150 are disposed at a predetermined interval. The incidence surface 151 faces the emission surface 31, and a gap 70 is provided between the emission surface 31 and the incidence surface 151 in the y direction. Since the visible light modulation device 1000 is exposed to the air, the gap 70 is filled with the air. Since the gap 70 is filled with the same gas (air), light of each color emitted from the LD 30 can easily enter an incidence route in a state in which predetermined coupling efficiency is satisfied. When the visible light modulation device 1000 is used for the AR glass or the VR glass, if a quantity of light or the like required for the AR glass or the VR glass is considered, a size of the gap (interval) 70 in the y direction is, for example, greater than 0 μm and equal to or less than 5 μm.

(Mach-Zehnder Type Optical Waveguide)

In the Mach-Zehnder type optical waveguide, a light beam with a wavelength and a phase is divided (demultiplexed) into a pair of two (pair) beams, given different phases, and then, merged (multiplexed). The intensity of the multiplexed light beam is changed depending on the phase difference.

The light modulation output part 200 has the three Mach-Zehnder type optical waveguides 10-1, 10-2 and 10-3, which is the same number of the optical semiconductor devices 30-1, 30-2 and 30-3. The optical semiconductor devices 30-1, 30-2 and 30-3 and the Mach-Zehnder type optical waveguides 10-1, 10-2 and 10-3 are positioned to enter the Mach-Zehnder type optical waveguide to which the light emitted from the optical semiconductor device corresponds.

The Mach-Zehnder type optical waveguide 10 (10-1, 10-2, 10-3) shown in FIG. 1 has a first optical waveguide 11, a second optical waveguide 12, an input route 13, an output route 14, a junction part 15, and a coupling part 16. While the first optical waveguide 11 and the second optical waveguide 12 shown in FIG. 1 has a configuration that extends linearly in the x direction except the vicinity of the junction part 15 and the vicinity of the coupling part 16, it is not limited to such a configuration. Lengths of the first optical waveguide 11 and the second optical waveguide 12 shown in FIG. 1 are substantially the same as each other. The junction part 15 is located between the input route 13, the first optical waveguide 11 and the second optical waveguide 12. The input route 13 connects the first optical waveguide 11 and the second optical waveguide 12 via the junction part 15. The coupling part 16 is located between the first optical waveguide 11, the second optical waveguide 12 and the output route 14. The first optical waveguide 11 and the second optical waveguide 12 are connected by the output route 14 via the coupling part 16.

The Mach-Zehnder type optical waveguide 10 includes the first optical waveguide 11 and the second optical waveguide 12 that are ridges (convex shapes) protruding from a first surface 40a of a slab layer 40 formed of lithium niobate. Hereinafter, all the slab layer 40 formed of lithium niobate and ridges 11 and 12 formed of lithium niobate may be referred to as a lithium niobate film. The first surface 40a is an upper surface in a portion except the ridge of the lithium niobate film. The two ridges (a first ridge and a second ridge) protrude from the first surface 40a in the z direction and extends along the Mach-Zehnder type optical waveguide 10. In the embodiment, the first ridge functions as the first optical waveguide 11, and the second ridge functions as the second optical waveguide 12.

A shape of an X-X cross section (a cross section perpendicular to a direction of advance of light) of the ridge (the first optical waveguide 11 and the second optical waveguide 12) shown in FIG. 2 is a rectangle, a width ($W_{ridge}$) in the y direction is, for example, 0.3 μm or more and 5.0 μm or less, and a height (a protrusion height H ($=T_{slab}-T_{LN}$) from the first surface 40a) of the ridge is, for example, 0.1 μm or more and 1.0 μm or less.

A shape of the ridge (the first optical waveguide 11 and the second optical waveguide 12) may be any shape as long as it can guide light, for example, a dome shape or a triangular shape.

The slab layer 40 formed of lithium niobate is, for example, a c-axis oriented lithium niobate film. The slab layer 40 formed of lithium niobate is, for example, an epitaxial film epitaxially grown on the substrate 140. The epitaxial film is a single crystal film, a crystal orientation of which is aligned by the underlying substrate. The epitaxial film is a film with a single crystal orientation in the z direction and a direction in the xy plane, and the crystals are aligned and oriented in all the x-axis, y-axis and z-axis directions. Whether or not it is the epitaxial film can be verified, for example, by confirming the peak intensity and the pole at an orientation position in 2θ-θ X-ray diffraction.

In addition, a lithium niobate film 40 formed of lithium niobate may be a lithium niobate film provided on a Si substrate via SiO$_2$.

The lithium niobate is compound expressed by LixN-bAyOz. A is an element other than Li, Nb and O. K, Na, Rb, Cs, Be, Mg, Ca, Sr, Ba, Ti, Zr, Hf, V, Cr, Mo, W, Fe, Co, Ni, Zn, Sc, Ce, or the like, can be exemplified as the element expressed by A. These elements may be used solely or may be used in combination of two or more. Here, x expresses a number of 0.5 or more and 1.2 or less. Here, x is, preferably, a number of 0.9 or more and 1.05 or less. Here, y expresses a number of 0 or more and 0.5 or less. Here, z expresses a number of 1.5 or more and 4.0 or less. Here, z is, preferably, a number of preferably 2.5 or more and 3.5 or less.

(Electrode)

Electrodes 21 and 22 are electrodes configured to apply a modulation voltage Vm to each of the Mach-Zehnder type optical waveguides 10-1, 10-2 and 10-3 (hereinafter, may be simply referred to as "each of the Mach-Zehnder type optical waveguides 10"). The electrode 21 is an example of the first electrode, and the electrode 22 is an example of the second electrode. A first end 21a of the electrode 21 is connected to a power supply 131, and a second end 21b is connected to a terminating resistor 132. A first end 22a of the electrode 22 is connected to the power supply 131, and a second end 22b is connected to the terminating resistor 132. The power supply 131 is a part of a driving circuit 210 configured to apply a modulation voltage Vm to each of the Mach-Zehnder type optical waveguides 10.

Electrodes 23 and 24 are electrodes configured to apply a direct current bias voltage Vdc to each of the Mach-Zehnder type optical waveguides 10. A first end 23a of the electrode 23 and a first end 24a of the electrode 24 are connected to a power supply 133. The power supply 133 is a part of a direct current bias applying circuit 220 configured to apply the direct current bias voltage Vdc to each of the Mach-Zehnder type optical waveguides 10.

In FIG. 1, a line width and line spacing of the electrode 21 and the electrode 22, which are disposed in parallel, are made wider than the actual ones to make it easier to see. For this reason, while a length (an interaction length) of a portion in which the electrode 21 and the first optical waveguide 11 overlap and a length of a portion in which the electrode 22 and the second optical waveguide 12 overlap seem to differ, these lengths (interaction lengths) are substantially the same as each other. Similarly, a length (an interaction length) of a portion in which the electrode 23 and the first optical waveguide 11 overlap and a length (an interaction length) of a portion in which the electrode 24 and the second optical waveguide 12 overlap are substantially the same as each other.

In addition, when the direct current bias voltage Vdc is superimposed on the electrodes 21 and 22, the electrodes 23 and 24 may be omitted. In addition, a grounding electrode may be provided around the electrodes 21, 22, 23 and 24.

The electrodes 21, 22, 23 and 24 are provided on the slab layer 40 formed of lithium niobate and the ridges 11 and 12 formed of lithium niobate with a buffer layer 32 sandwiched therebetween. Each of the electrodes 21 and 23 can apply an electric field to the first optical waveguide 11. Each of the electrodes 21 and 23 is located at, for example, a position overlapping the first optical waveguide 11 in the z direction when seen in a plan view. Each of the electrodes 21 and 23 is located above the first optical waveguide 11. Each of the electrodes 22 and 24 can apply an electric field to the second optical waveguide 12. Each of the electrodes 22 and 24 is located at, for example, a position overlapping the second optical waveguide 12 in the z direction when seen in a plan view. Each of the electrodes 22 and 24 is located above the second optical waveguide 12.

The buffer layer 32 is located between each of the Mach-Zehnder type optical waveguides 10 and the electrodes 21, 22, 23 and 24. A protective layer 31 and the buffer layer 32 cover and protect the ridge. In addition, the buffer layer 32 prevents the light propagating through each of the Mach-Zehnder type optical waveguides 10 from being absorbed by the electrodes 21, 22, 23 and 24. The buffer layer 32 has a refractive index lower than that of the lithium niobate film 40. The protective layer 31 and the buffer layer 32 are formed of, for example, SiInO, SiO$_2$, Al$_2$O$_3$, MgF$_2$, La$_2$O$_3$, ZnO, HfO$_2$, MgO, Y$_2$O$_3$, CaF$_2$, In$_2$O$_3$, or the like, or a mixture thereof. The protective layer 31 and the buffer layer 32 may be the same material or may be different materials. When they are different materials, they can be appropriately selected from viewpoints of improvement of DC drift, Vx reduction, propagation loss reduction, and the like.

A size of the light modulation output part 200 including the Mach-Zehnder type optical waveguide 10 is, for example, 100 mm$^2$ or less. When a size of the light modulation output part 200 is 100 mm$^2$ or less, it is appropriate for the AR glass or the VR glass.

The light modulation output part 200 including the Mach-Zehnder type optical waveguide 10 can be fabricated through a known method. For example, the light modulation output part 200 is manufactured using a semiconductor process such as epitaxial growth, photolithography, etching, gas phase growth, metallization, and the like.

Figure 4:
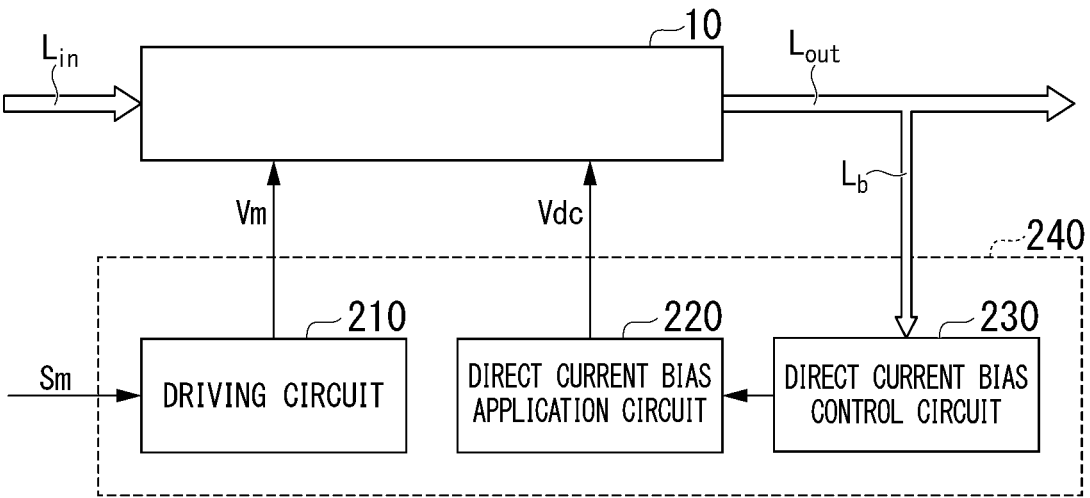
FIG. 4 is a block diagram of a light modulation output part 200.

FIG. 4 is a block diagram of the light modulation output part 200.

A control part 240 of the light modulation output part 200 has the driving circuit 210, the direct current bias applying circuit 220, and a direct current bias control circuit 230.

The driving circuit 210 applies the modulation voltage Vm according to a modulation signal Sm to the Mach-Zehnder type optical waveguide 10. The direct current bias applying circuit 220 applies the direct current bias voltage Vdc to the Mach-Zehnder type optical waveguide 10. The direct current bias control circuit 230 monitors output light Lout, and controls the direct current bias voltage Vdc output from the direct current bias applying circuit 220. An operating point Vd, which will be described below, is controlled by adjusting the direct current bias voltage Vdc.

The light modulation output part 200 converts an electrical signal into an optical signal. The light modulation output part 200 modulates input light L$_{in}$ emitted from the optical semiconductor device 30 and input from the input route 13 of the Mach-Zehnder type optical waveguide 10 to the output light L$_{out}$. A modulation operation of the light modulation output part 200 will be described.

The input light L$_{in}$ emitted from the optical semiconductor device 30 and input from the input route 13 is demultiplexed and propagated to the first optical waveguide 11 and the second optical waveguide 12. The phase difference between the light propagating through the first optical waveguide 11 and the light propagating through the second optical waveguide 12 is zero at the point of demultiplexing.

Next, a voltage is applied between the electrode 21 and the electrode 22. For example, differential signals having the same absolute value, opposite polarities, and phases that are not deviated from each other may be applied to the electrode 21 and the electrode 22, respectively. Refractive indices of the first optical waveguide 11 and the second optical waveguide 12 are changed by an electro-optic effect. For example, the refractive index of the first optical waveguide 11 is changed by $+\Delta n$ from a reference refractive index n, and the refractive index of the second optical waveguide 12 is changed by $-\Delta n$ from the reference refractive index n.

A difference between the refractive indices of the first optical waveguide 11 and the second optical waveguide 12 creates a phase difference between the light propagating through the first optical waveguide 11 and the light propagating through the second optical waveguide 12. The lights propagating through the first optical waveguide 11 and the second optical waveguide 12 are merged in the output route 14 and output as the output light $L_{out}$. The output light $L_{out}$ is obtained by overlapping the light propagating through the first optical waveguide 11 and the light propagating through the second optical waveguide 12. The intensity of the output light $L_{out}$ is changed according to an odd number of times a phase difference of the light propagating through the first optical waveguide 11 and the light propagating through the second optical waveguide 12. In this procedure, the Mach-Zehnder type optical waveguide 10 modulates the input light $L_{in}$ to the output light $L_{out}$ according to the electrical signal.

The modulation voltage Vm according to the modulation signal is applied to the electrodes 21 and 22 for application of the modulation voltage of the light modulation output part 200. The voltage applied to the electrodes 23 and 24 for application of the direct current bias voltage, i.e., the direct current bias voltage Vdc output from the direct current bias applying circuit 220 is controlled by the direct current bias control circuit 230. The direct current bias control circuit 230 adjusts the operating point Vd of the light modulation output part 200 by controlling the direct current bias voltage Vdc. The operating point Vd is a voltage that is a center of the modulation voltage amplitude.

Figure 5:
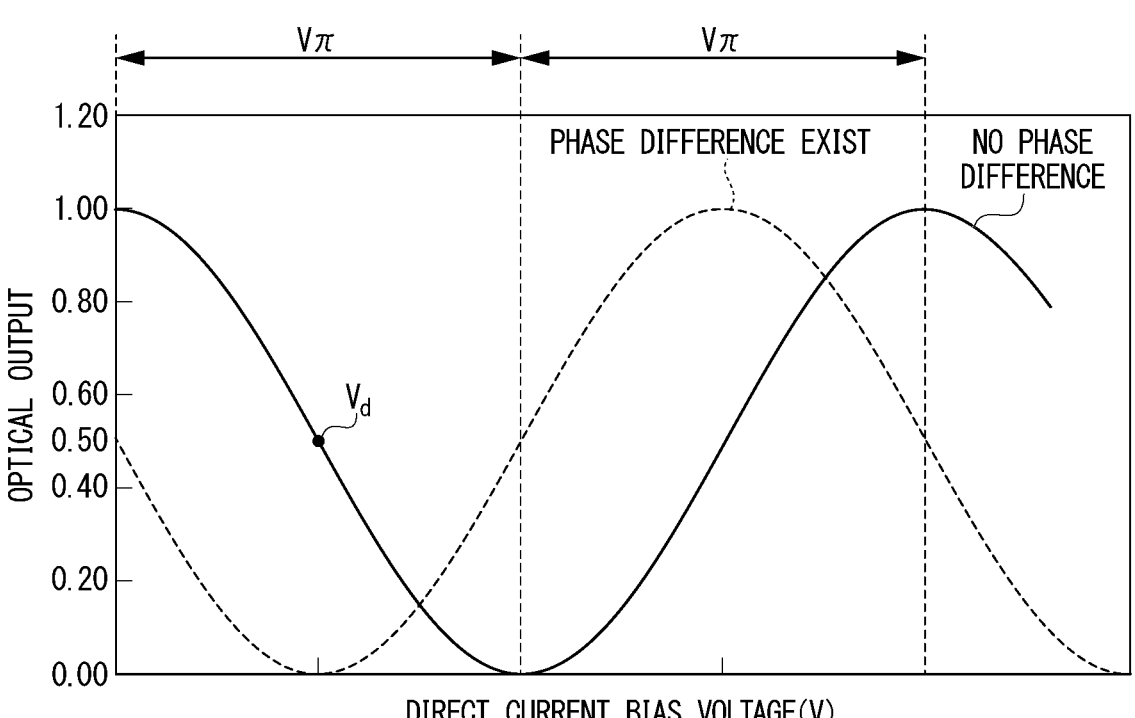
FIG. 5 is a view showing an optical modulation curve in each Mach-Zehnder type optical waveguide.

An optical modulation curve by each of the Mach-Zehnder type optical waveguides 10 will be described with reference to FIG. 5. FIG. 5 is a view showing a relation between the direct current bias voltage and the output for the Mach-Zehnder type optical waveguide that does not have a configuration in which a phase difference occurs between the two optical waveguides (the first optical waveguide 11 and the second optical waveguide 12) and the Mach-Zehnder type optical waveguide having a configuration in which a phase difference occurs between the two optical waveguides. A lateral axis of FIG. 5 is a direct current bias voltage applied to the electrodes 23 and 24, and a vertical axis is a standardized output from the Mach-Zehnder type optical waveguide 10. The output is standardized as "1" when a phase difference between the light propagating through the first optical waveguide 11 and the light propagating through the second optical waveguide 12 is zero. A solid line shows properties of the Mach-Zehnder type optical waveguide that does not have a configuration in which a phase difference occurs, and a broken line shows properties of the Mach-Zehnder type optical waveguide having a configuration in which a phase difference occurs.

In the Mach-Zehnder type optical waveguide that does not have the configuration in which the phase difference occurs, in a state in which the voltage is not applied (Vdc=0), the lights of the same phase passing through the two optical waveguides interfere with the coupling part 16 and strengthen each other, and the output as the Mach-Zehnder type optical waveguide reaches a maximum value.
(Multiplexing Part)

Figure 6:
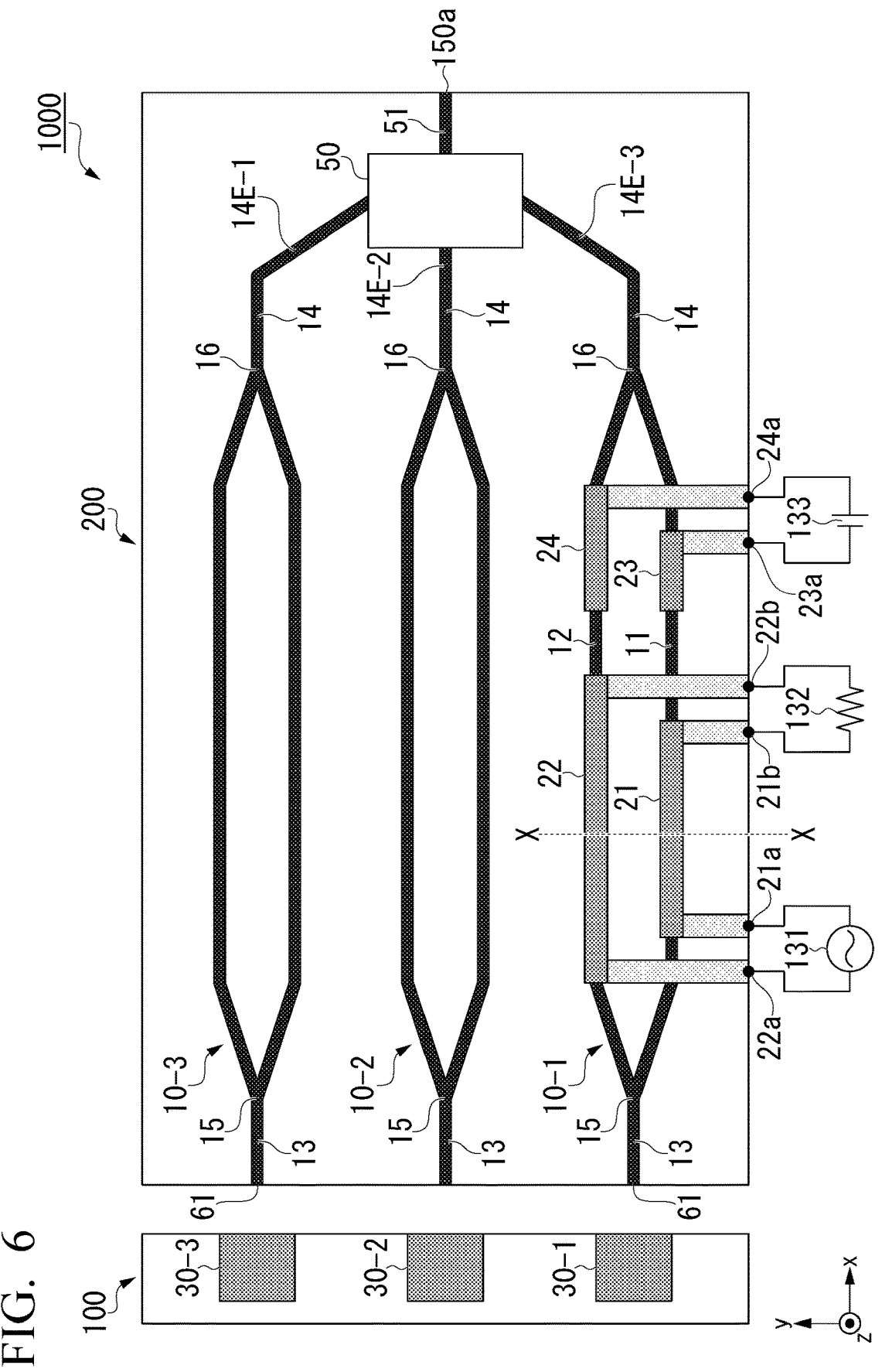
FIG. 6 is a plan view schematically showing a visible light modulation device having a multiplexing part.

As shown in FIG. 6, a visible light modulation device 1000 may have a multiplexing part 50 configured to multiplex modulation light from three Mach-Zehnder type optical waveguides in a light modulation output part 200. The multiplexing part 50 multiplexes the light propagating through an output route 14E-2 of the Mach-Zehnder type optical waveguide 10-2 and the light propagating through an output route 14E-3 of the Mach-Zehnder type optical waveguide 10-3, and emits the light from an emission port 150a via an output waveguide 51. Like Patent Document 2, since the multiplexer is not a configuration that is separated from the modulator, resolving power, tint, or the like, is improved.

Figure 7A:
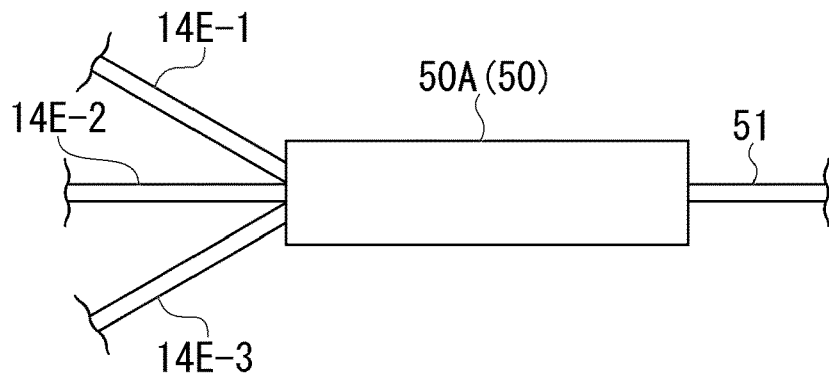
FIG. 7 is a view schematically showing that FIGS. 7A and 7B are MMI type multiplexers.
FIG. 7C is a Y type multiplexer.
FIG. 7D is a directional coupler.
Figure 7B:
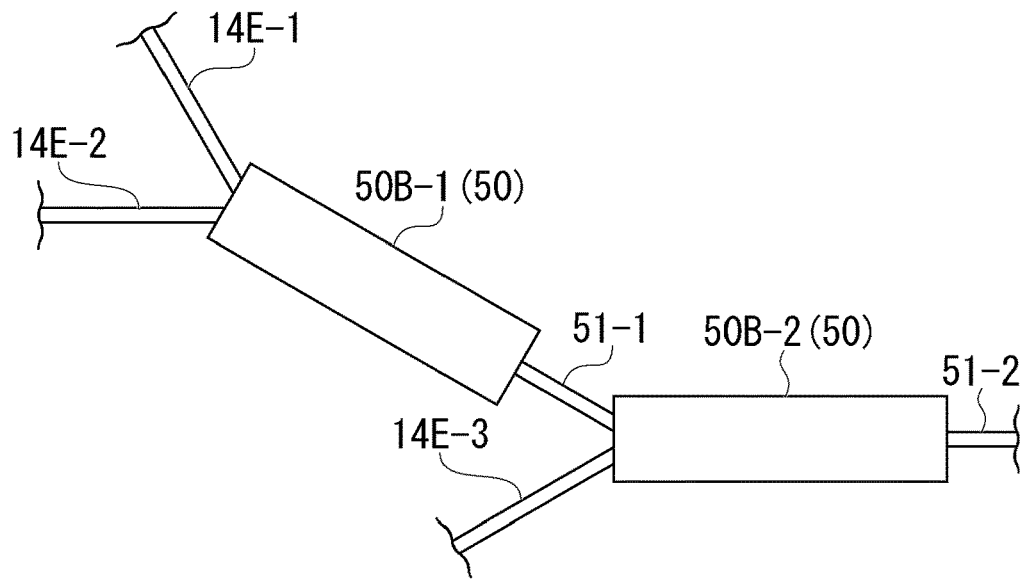
Figure 7C:
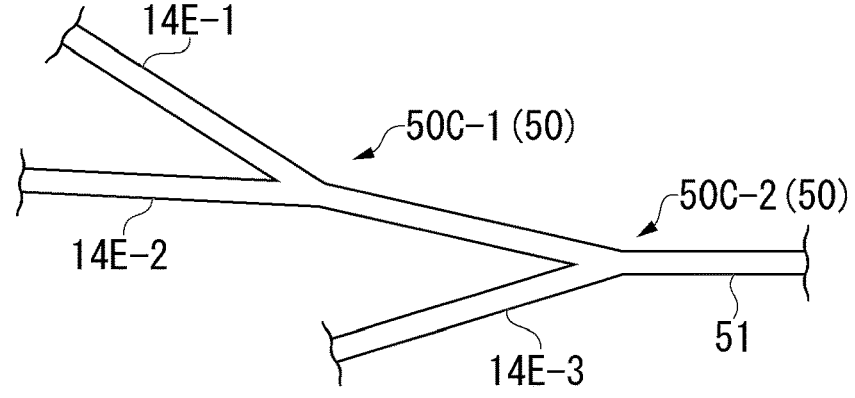
Figure 7D:
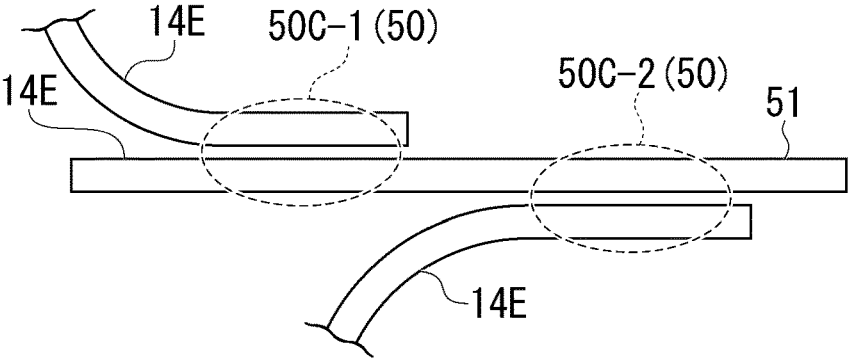

The multiplexing part 50 may be any one selected from the group consisting of a multi-mode interferometer (MMI) type multiplexer (see FIGS. 7A and 7B, a Y type multiplexer (see FIG. 7C), and a directional coupler (see FIG. 7D).

The multiplexing part 50 shown in FIG. 7A is a multiplexing part 50A configured to multiplex the light propagating through the output route 14E-1 of the Mach-Zehnder type optical waveguide 10-1, the light propagating through the output route 14E-2 of the Mach-Zehnder type optical waveguide 10-2, and the light propagating through the output route 14E-3 of the Mach-Zehnder type optical waveguide 10-3, and the light multiplexed from the multiplexing part 50A is output to the output waveguide 51.

In addition, the multiplexing part 50 shown in FIG. 7B is constituted by a multiplexing part 50B-1 configured to multiplex first the light propagating through the output route 14E-1 of the Mach-Zehnder type optical waveguide 10-1 and the light propagating through the output route 14E-2 of the Mach-Zehnder type optical waveguide 10-2, and a multiplexing part 50B-2 configured to multiplex second the light obtained by outputting and propagating the multiplexed light from the multiplexing part 50B-1 and the light propagating through the output route 14E-3 of the Mach-Zehnder type optical waveguide 10-3, and the light multiplexed from the multiplexing part 50B-2 is output to the output waveguide 51.

In addition, the multiplexing part 50 shown in FIG. 7C is constituted by a multiplexing part 50C-1 configured to multiplex first the light propagating through the output route 14E-1 of the Mach-Zehnder type optical waveguide 10-1 and the light propagating through the output route 14E-2 of the Mach-Zehnder type optical waveguide 10-2, and a multiplexing part 50C-2 configured to multiplex second the light obtained by outputting and propagating the multiplexed light from the multiplexing part 50C-1 and the light propagating through the output route 14E-3 of the Mach-Zehnder type optical waveguide 10-3, and the light multiplexed from the multiplexing part 50C-2 is output to the output waveguide 51.

In addition, the multiplexing part 50 shown in FIG. 7D is constituted by a directionality coupling part 50D-1 configured to couple first the light propagating through the output route 14E-1 of the Mach-Zehnder type optical waveguide 10-1 to the light propagating through the output route 14E-2 of the Mach-Zehnder type optical waveguide 10-2, and a directionality coupling part 50D-2 configured to couple second the light propagating through the output route 14E-3 of the Mach-Zehnder type optical waveguide 10-3 to the multiplexed light, and the light coupled and multiplexed from the directionality coupling part 50C-2 is output to the output waveguide 51.

The visible light modulation device 1000 may have a controller (not shown) configured to control current values injected into each of the three optical semiconductor devices 30 such that a peak output of each wavelength in the light emitted to the outside through the three Mach-Zehnder type optical waveguide 10 becomes a predetermined ratio. Since it depends on a user, application, or sensitivity of human color sense (the most sensitive to green), it is possible to make an appropriate selection such that a peak output of each wavelength becomes a predetermined ratio.

It is known that side surface roughness in an etching process is a main cause of optical loss in the optical waveguide. In addition, it is known that the optical loss by the side surface roughness is increased as the wavelength is reduced.

That is, it is known that, when the light propagating through the optical waveguide is each of blue (B), green (G) and red (R), a magnitude of the optical loss is B>G>R.

Here, the visible light modulation device 1000 may have the three Mach-Zehnder type optical waveguides 10 configured such that a peak output of each wavelength in the light emitted to the outside through the three Mach-Zehnder type optical waveguides 10 (10-1, 10-2, 10-3) becomes a predetermined ratio using the current value injected into each of the three optical semiconductor devices 30 as a fixed value. By setting the current that drives the laser to the same value for each wavelength, it is possible to use a simple driver, and as a result, a simple circuit can be realized and further miniaturization becomes possible.

If the three Mach-Zehnder type optical waveguides have the same configuration, and when the optical loss by the side surface roughness does not depend on the color of the light propagating through the optical waveguide, the ratio of the optical outputs of the output colors (or the ratio of the optical outputs of the multiplexed colors when the multiplexing part is provided) becomes R:G:B=1:1:1, since the optical loss by the side surface roughness depends on the color of the light propagating through the optical waveguide, the configurations of the three Mach-Zehnder type optical waveguides are different from each other, and thus, a difference in the optical loss by the side surface roughness can be compensated.

In addition, depending on the application, it may be desired to have a desired ratio instead of R:G:B=1:1:1, but even in this case, the configurations of the three Mach-Zehnder type optical waveguides can be determined to have a predetermined ratio.

FIG. 8 to FIG. 10 show a configuration example in which a ratio of the optical outputs of the output colors (or a ratio of the optical outputs of the multiplexed colors when the multiplexing part is provided) approaches R:G:B=1:1:1.

Figure 8A:
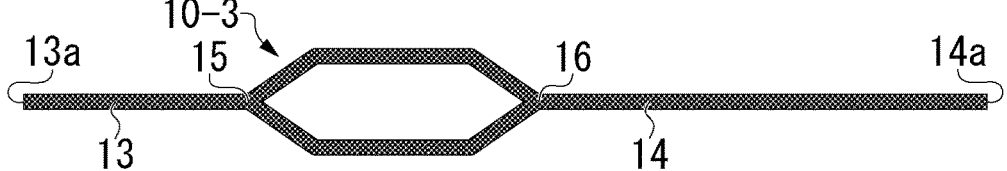
FIG. 8 is a first configuration example in which a ratio of optical outputs of colors approaches 1:1:1.
Figure 8B:
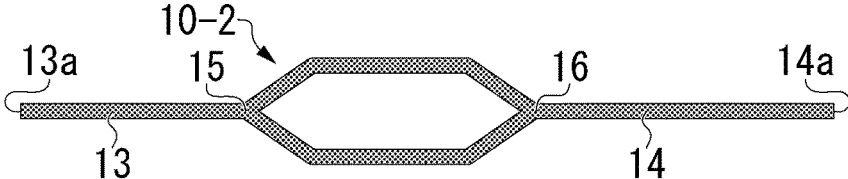
Figure 8C:
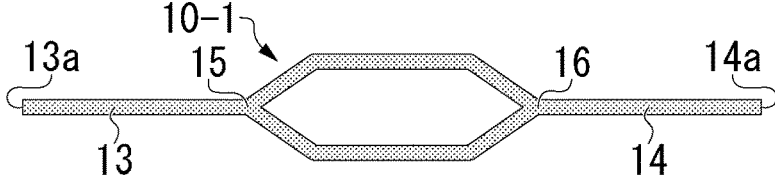

Among the three Mach-Zehnder optical waveguides 10 (10-1, 10-2, 10-3) shown in FIG. 8A to 8C, the Mach-Zehnder optical waveguide through which light with a shorter wavelength propagates has a shorter optical waveguide length from the incident end 13*a* to the output end 14*a*. For the problem specific to a ridge-type waveguide structure in which the propagation loss is increased as the wavelength becomes shorter even when the side surface roughness of the ridge is the same, the propagation loss at each wavelength can be aligned by shortening the length of the optical waveguide through which light with the shorter wavelength propagates.

With this configuration, the ratio of the light output of each color (or the ratio of the light output of the multiplexed light when the multiplexing part is provided) can approach R:G:B=1:1:1.

In the configurations shown in FIG. 8, while the exit portion 14 of the optical waveguide have different lengths, the incident portion 13 of the optical waveguide may have different lengths, or the incident portion 13 and the exit portion 14 may have different lengths.

Figure 9A:
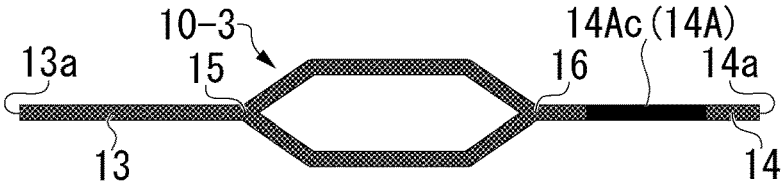
FIG. 9 is a second configuration example in which a ratio of optical outputs of colors approaches 1:1:1.
Figure 9B:
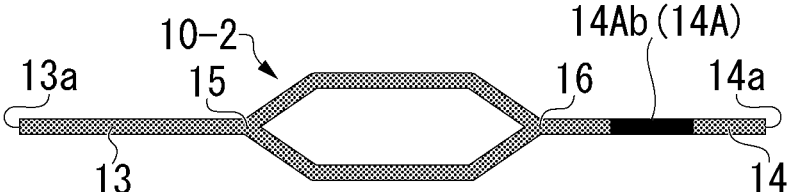
Figure 9C:
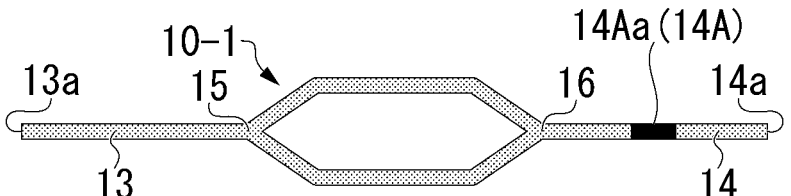

Three Mach-Zehnder optical waveguides 10 (10-1, 10-2, 10-3) shown in FIGS. 9A to 9C have light absorption parts 14A (14Aa, 14Ab, 14Ac) formed of a material that is absorptive for the wavelength of propagating light in the optical waveguide from the incident end 13*a* to the output end 14*a*. Among the three Mach-Zehnder optical waveguides 10 (10-1, 10-2, 10-3) shown in FIGS. 9A to 9C, the Mach-Zehnder optical waveguide through which light with a shorter wavelength propagates has a shorter light absorption parts 14A in the length direction of the optical waveguide. This configuration also makes it possible to align the propagation loss at each wavelength.

With this configuration, the ratio of the light output of each color (or the ratio of the light output of the multiplexed light when the multiplexing part is provided) can approach R:G:B=1:1:1.

In the configurations shown in FIG. 9A to 9C, while the light absorption parts 14A are provided in the exit portion 14 of the optical waveguide, the light absorption parts 14A may be provided in the incident portion 13 of the optical waveguide, or the light absorption parts 14A may be provided both in the incident portion 13 and the exit portion 14.

Figure 10A:
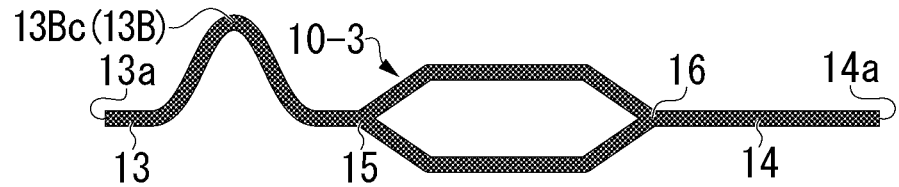
FIG. 10 is a third configuration example in which a ratio of optical outputs of colors approaches 1:1:1.
Figure 10B:
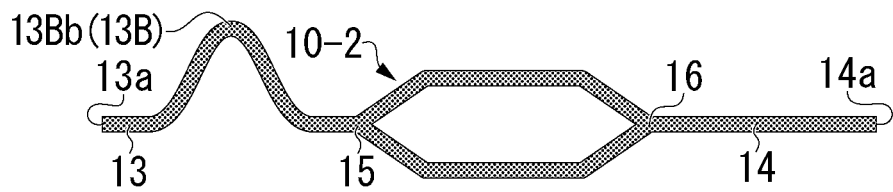
Figure 10C:
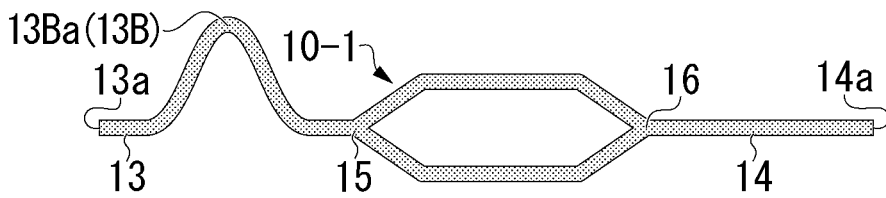

Three Mach-Zehnder optical waveguides 10 (10-1, 10-2, 10-3) shown in FIG. 10A to 10C have curved parts 13B (13Ba, 13Bb, 13Bc) having a curvature in the optical waveguides from the incident end 13*a* to the output end 14*a*. Among the three Mach-Zehnder optical waveguides 10 (10-1, 10-2, 10-3) shown in FIG. 10A to 10C, the Mach-Zehnder optical waveguide through which light with a shorter wavelength propagates has a curved part 13B having a larger curvature and a shorter length thereof. This configuration also makes it possible to align the propagation loss at each wavelength.

With this configuration, the ratio of the light output of each color (or the ratio of the light output of the multiplexed light when the multiplexing part is provided) can approach R:G:B=1:1:1.

In the configurations shown in FIG. 10A to 10C, while the Mach-Zehnder optical waveguide through which light with a shorter wavelength propagates has a curved part 13B having a larger curvature and a shorter length thereof, the Mach-Zehnder optical waveguide through which light with a shorter wavelength propagates may have a curved part 13B having a larger curvature or may have a curved part 13B having a shorter length thereof.

In the configurations shown in FIG. 10A to 10C, while the curved parts 13B are provided in the incident portion 13, the curved parts 13B may be provided in the exit portion 14, and the curved parts 13B may be provided both in the incident portion 13 and the exit portion 14.

For the three Mach-Zehnder type optical waveguides 10 (10-1, 10-2, and 10-3), maximum values of the optical outputs may have the same intensity.

Figure 11:
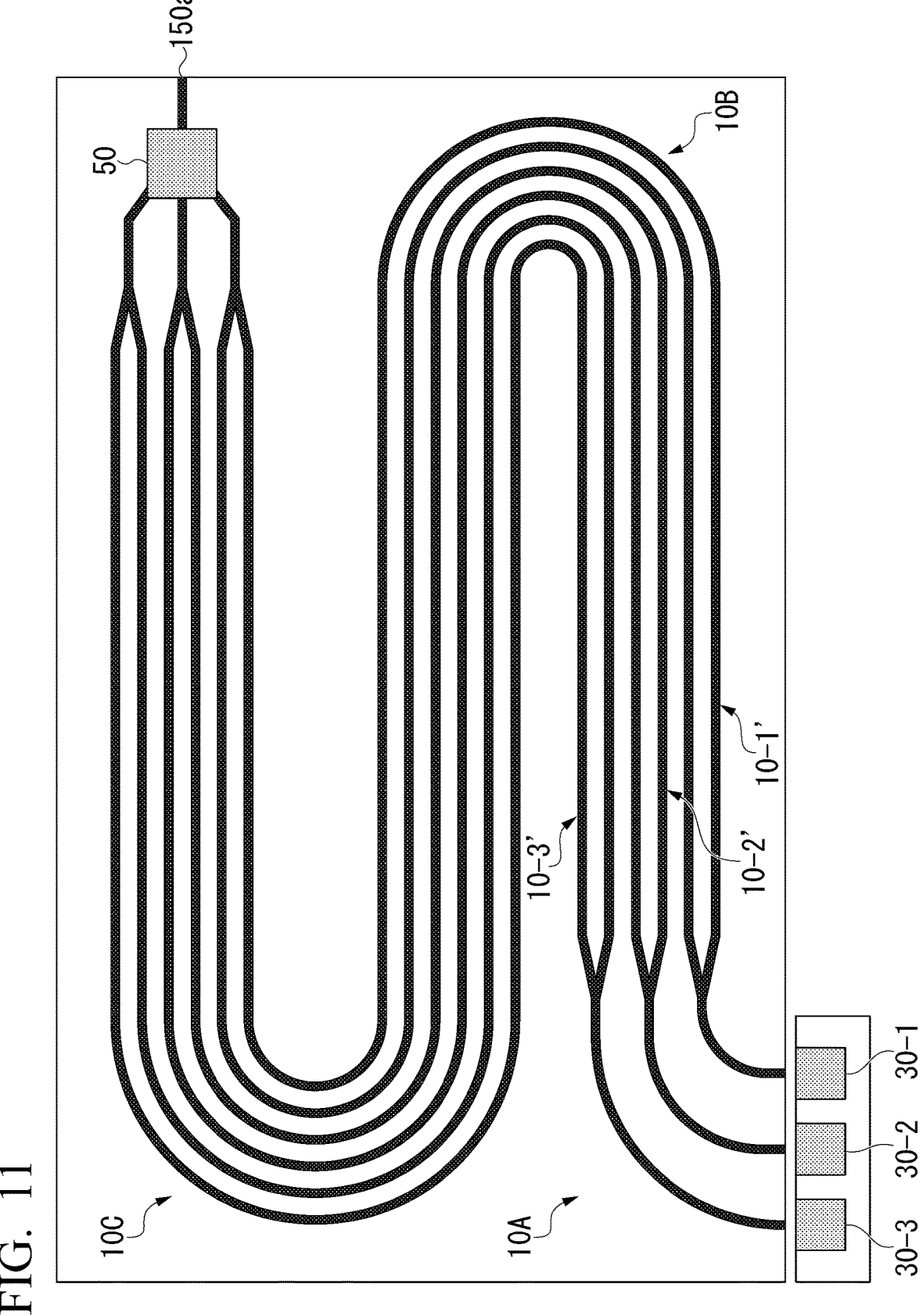
FIG. 11 is plan view schematically showing a Mach-Zehnder type optical waveguide having a curved section.

As shown in FIG. 11, each of Mach-Zehnder type optical waveguides 10' (10-1', 10-2', 10-3') may have curved sections 10A, 10B and 10C. The curved sections may be included in any of portions of two mode waveguides 11 and 12 (portions shown by reference sign 10B and reference sign 10C), an incidence route (a portion shown by reference sign 10A), or an emission route in the Mach-Zehnder type optical waveguide.

In the configuration of the optical waveguide obtained by processing the single crystal lithium niobate thin film formed on the substrate in the convex shape, a high refractive index difference can be applied to a space between the core section (single crystal lithium niobate thin film) and the clad section (side surface and upper surface materials of the substrate and optical waveguide), and the optical waveguide can be curved with a large curvature. The size in the longitudinal direction can be reduced by the curving. In addition, since the interaction length can be increased while reducing the size of the external form, the driving voltage can be lowered.

(Stray Light Propagation Prevention Part)

A portion of the light modulation output part 200 other than the Mach-Zehnder type optical waveguide has a groove section reaching a substrate on which the Mach-Zehnder type optical waveguide is formed from a surface of the device, and a light absorption layer may be provided on an at least a bottom surface and a side surface of the groove section. It is possible to remove stray light and improve tint or the like by preventing the light from propagating to the clad section.

This is because it is possible to prevent stray light propagating through the portion of the light modulation output part 200 including the substrate from emitting to the outside. Although the light modulation output part 200 can be miniaturized, miniaturization makes it more likely that an ingredient of the light that is not coupled to the optical waveguide occurs in the alignment process of aligning the optical axis. An ingredient of such light propagates through the portion of the light modulation output part 200 other than the optical waveguide, and after multiple reflections on the end surface, a part thereof is input into a light detector, i.e., stray light easily occurs. The stray light propagating through the light modulation output part 200 inhibits alignment of the light detector, and causes an increase in connecting loss or poor connections. In particular, when the visible light is used as the light source, since the optical waveguide is small, an influence due to the stray light is large. For this reason, the light absorption layer formed on the groove section and the surface thereof may be provided as the stray light propagation prevention part.

Figure 12:
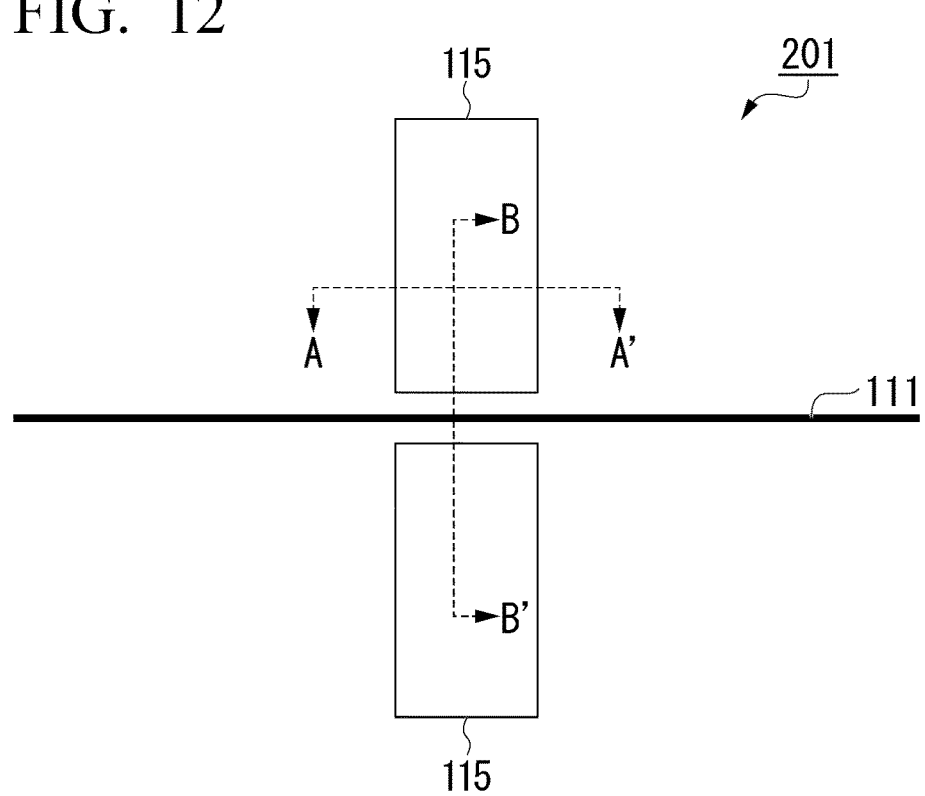
FIG. 12 is a schematic plan view for describing a stray light propagation prevention part.
Figure 13:
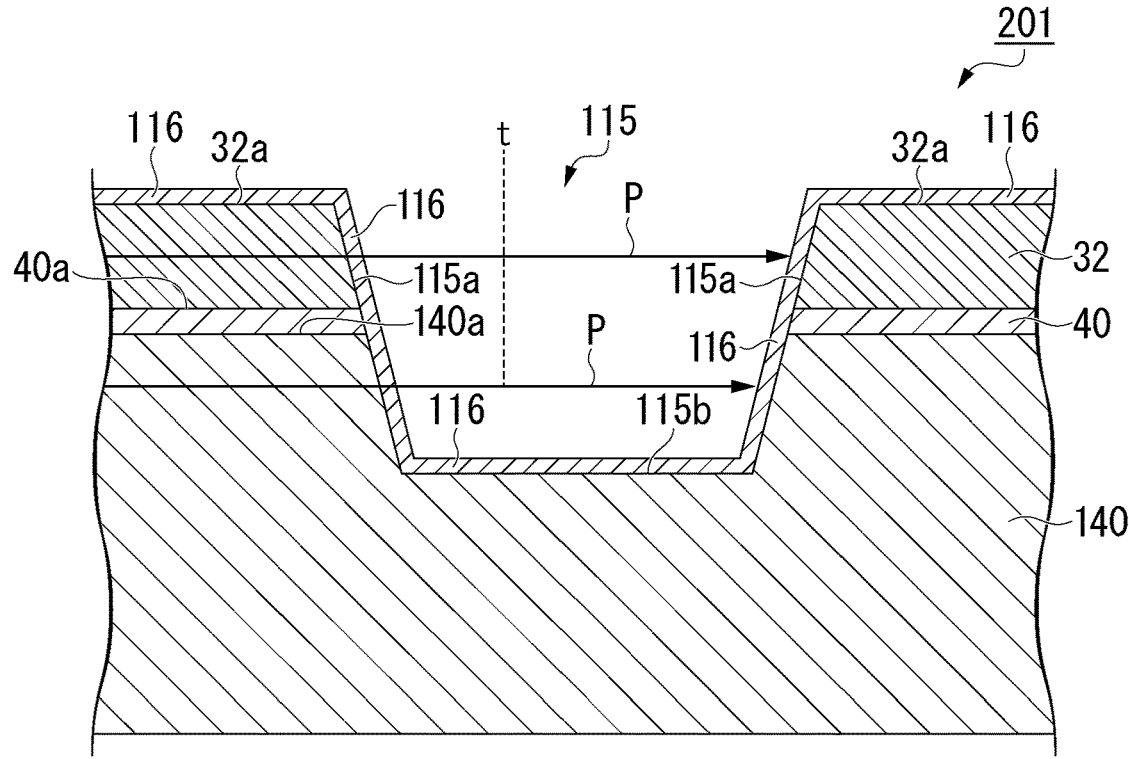
FIG. 13 is a cross-sectional view along line A-A' of FIG. 12.
Figure 14:
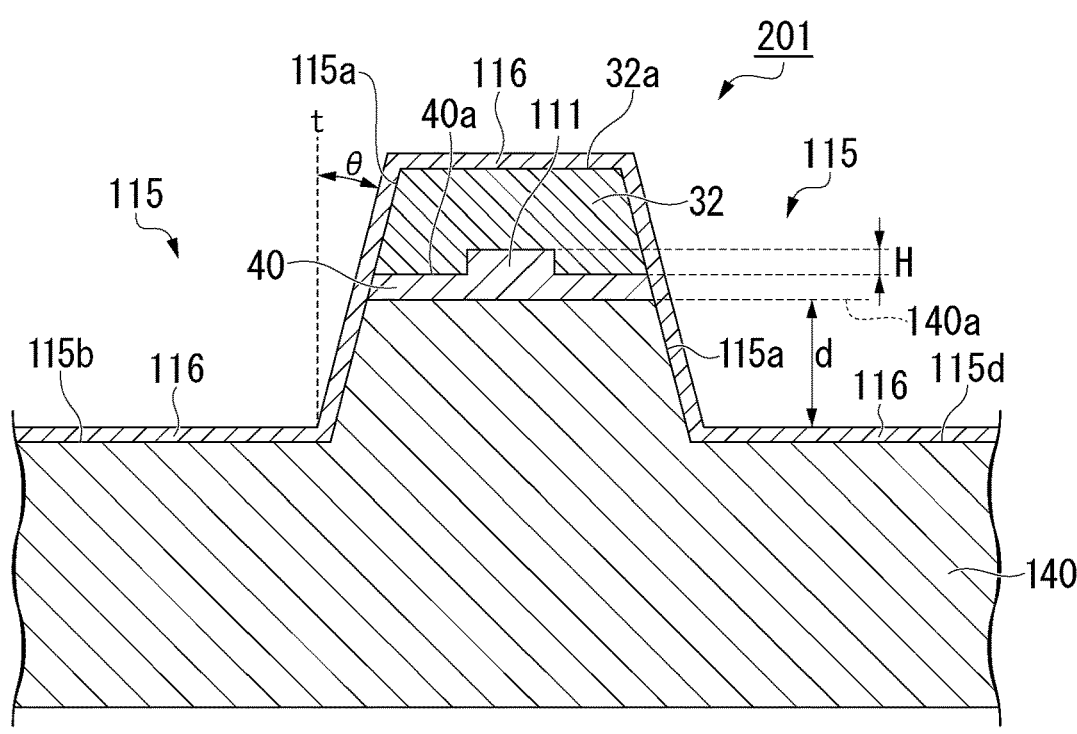
FIG. 14 is a cross-sectional view along line B-B' of FIG. 12.

The stray light propagation prevention part will be described by taking a configuration with a groove section 115 in the vicinity of an optical waveguide 11 as an example. FIG. 12 is a plan view schematically showing such a configuration. FIG. 13 is a cross-sectional view along line A-A' of FIG. 12. FIG. 14 is a cross-sectional view along line B-B' of FIG. 12.

As shown in FIG. 12, the groove section 115 is formed in a light modulation output part 201 in the vicinity of the optical waveguide 111. The groove section 115 is formed at parts of both sides of the optical waveguide 111. The groove section 115 is formed in a rectangle, for example, a rectangular shape when one surface of the substrate is seen in a plan view. In addition, the groove section 115 is formed to have an inverted trapezoidal shape as a cross-sectional shape of the visible light modulation device 1000 in a thickness direction (a lamination direction) t, and a side surface 115*a* of the groove section 115 is formed to have an inclined surface inclined with respect to the thickness direction t.

The groove section 115 is formed to extend from a surface 32*a* of the buffer layer 32 toward the substrate 140 to a position that is deeper than one surface 140*a* of the substrate 140. That is, a bottom surface 115*b* of the groove section 115 is formed at a position inside the substrate from the one surface 140*a* of the substrate 140, and the substrate 140 has a portion recessed in the thickness direction t in a portion in which the groove section 115 is formed.

Figure 15:
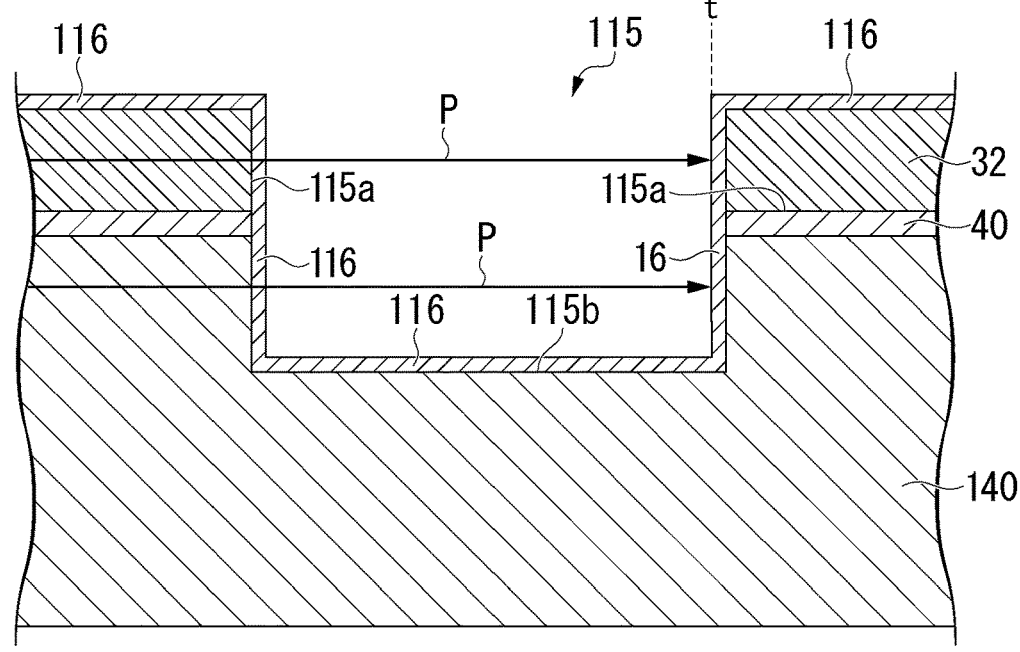
FIG. 15 is a cross-sectional view showing another form example of a groove section.

Further, in the embodiment, while the side surface 115*a* of the groove section 115 is an inclined surface that is inclined by a predetermined inclination angle θ with respect to the thickness direction t, for example, as shown in FIG. 15, the groove section 115 is formed to have a rectangular shape as a cross-sectional shape of the visible light modulation device 1000 in the thickness direction t, and the side surface 115*a* of the groove section 115 can be formed to have a vertical surface in the thickness direction t.

A depth of a portion of the groove section 115 in the substrate 140 dug from the one surface 140*a* of the substrate 140 in the thickness direction t, i.e., a gap d between the one surface 140*a* of the substrate 140 and the bottom surface of the groove section 115 may be set according to the wavelength of the light propagating through the optical waveguide 111. That is, the gap d may be set to a half or more of the wavelength of the light propagating through the optical waveguide 111. For example, when the wavelength of the light propagating through the optical waveguide 11 is 520 nm, the groove section 115 may be formed such that the gap d is 260 nm or more.

The substrate 140 from the bottom surface 115*b* of the groove section 115, the lithium niobate layer on which the optical waveguide 111 is formed in a ridge shape, and the buffer layer 32 are formed between these two groove sections 115 to extend in a dam shape with a narrow width.

A light absorption layer 116 configured to cover the bottom surface 115*b* and the side surface 115*a* of the groove section 115 is formed on the groove section 115. In the embodiment, the light absorption layer 116 is also formed to further cover the surface 32*a* of the buffer layer 32, in addition to the bottom surface 115*b* and the side surface 115*a* of the groove section 115. Further, the light absorption layer 116 may be a structure that does not cover the surface 32*a* of the buffer layer 32.

The light absorption layer 116 is formed of a material that absorbs light propagating through the optical waveguide 111. A configuration material of the light absorption layer 116 is selected according to the wavelength of the light propagating through the optical waveguide 111. For example, when the light propagating through the optical waveguide 111 is visible light, a material that can absorb and block light with a visible light wavelength, for example, a resin material including a visible light absorption pigment, a semiconductor film such as In or Ga, or the like, can be used. In addition, for example, when the light propagating through the optical waveguide 111 is infrared light, a material that can absorb and block light with an infrared light wavelength length, for example, a resin material including infrared light absorption pigment such as cyanine compound or the like can be used.

The light absorption layer 116 may be formed to have a thickness where, for example, 50% or more of stray light P entering the light absorption layer 116 can be absorbed, and thus, the stray light P is absorbed while passing through the light absorption layer 116 formed on one side surface 115*a* of the groove section 115 and the light absorption layer 116 formed on the other side surface 115*a*.

Figure 16:
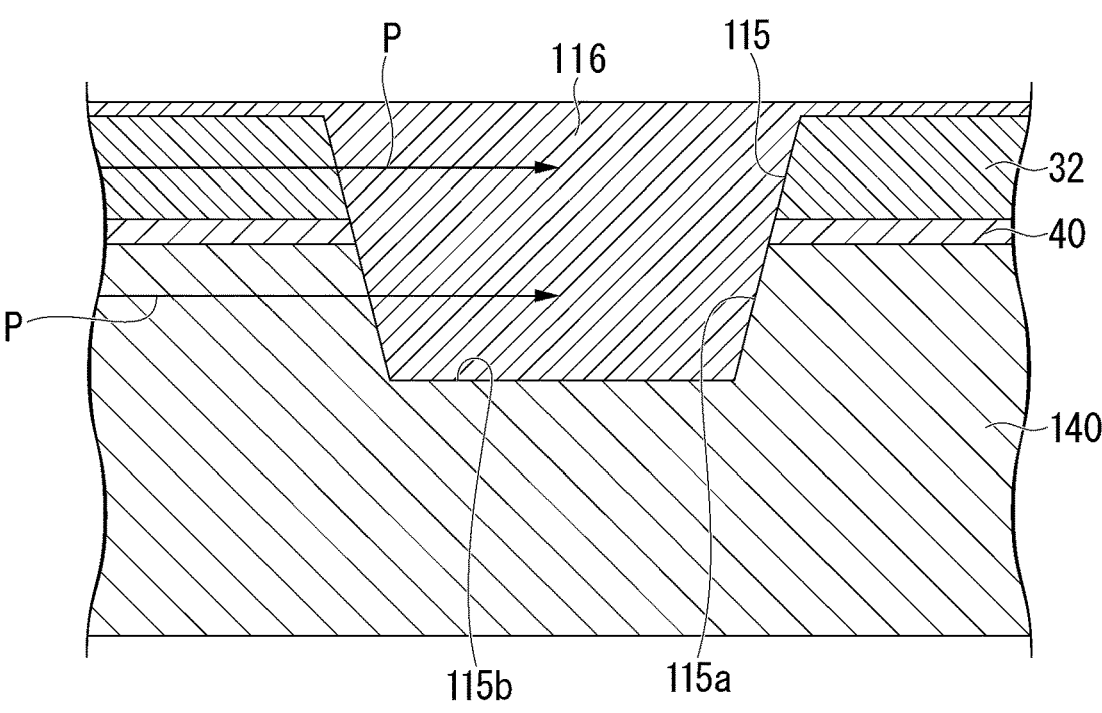
FIG. 16 is a cross-sectional view showing another formation example of a light absorption layer.

Like the embodiment, the light absorption layer 116 can be formed as shown in, for example, FIG. 16, in addition to formation on the bottom surface 115*b* and the side surface 115*a* of the groove section 115 with a predetermined thickness. In FIG. 16, the light absorption layer 116 is formed to fill the entire groove section 115 including the bottom surface 115*b* and the side surface 115*a*. With this configuration, the stray light P can be more reliably absorbed.

According to the light modulation output part 201 of the embodiment of the above-mentioned configuration, for example, in an alignment process of aligning optical axes between a light source (light emitter) S configured to introduce light into the optical waveguide 111 and an input end portion IN of the optical waveguide 111, an ingredient of the light that is not coupled to the optical waveguide 111 may occur. The ingredient of the light that is not coupled to the optical waveguide 111 becomes the stray light P propagating through the portion of the visible light modulation device 1000 except the optical waveguide 111, for example, the vicinity of the one surface 140a of the substrate 140, and the buffer layer 32. In the light modulation output part 201 of the embodiment, when the stray light P reaches the formation position of the groove section 115, the stray light P is absorbed by the light absorption layer 116.

In particular, since the stray light P propagating through the vicinity of the one surface 140a of the substrate 140 is formed at a position where the groove section 115 is deeper than the one surface 140a of the substrate 140 in the thickness direction t, the stray light can be reliably absorbed by the light absorption layer 116 formed thereon.

Since the stray light P is absorbed and blocked by the groove section 115 and the light absorption layer 116 formed on the groove section 115, the stray light P is not input into the light detector (not shown) disposed on an output end portion OUT of the optical waveguide 111. Accordingly, in the alignment process, it is possible to prohibit alignment of the light detector and prevent occurrence of an increase in connecting loss or occurrence of poor connection.

Next, blocking the stray light P can be performed by appropriately setting an inclination angle θ of the side surface 115a of the groove section 115. For example, in the case in which the stray light P enters a space (air layer) of the groove section 115 from the buffer layer 32, if a refractive index of the air is 1 and a refractive index of the buffer layer 32 is about 3.5, total reflection occurs on an interface with the buffer layer 32 when an incidence angle of the stray light P on the air interface is about 15° or more due to the refractive index difference. The fact that the incidence angle of the stray light P to the side surface 115a of the groove section 115 is 15° or more is the case in which the inclination angle θ of the side surface 115a is +15° or more, reflectivity of the stray light P is 100% at this time, and the stray light P is completely emitted above or below the visible light modulation device 1000 and removed.

Next, a light modulation output part 202 of another embodiment will be described. Further, in the following embodiment, the same components as the above-mentioned embodiment are designated by the same reference numerals and overlapping description thereof will be omitted.

Figure 17:
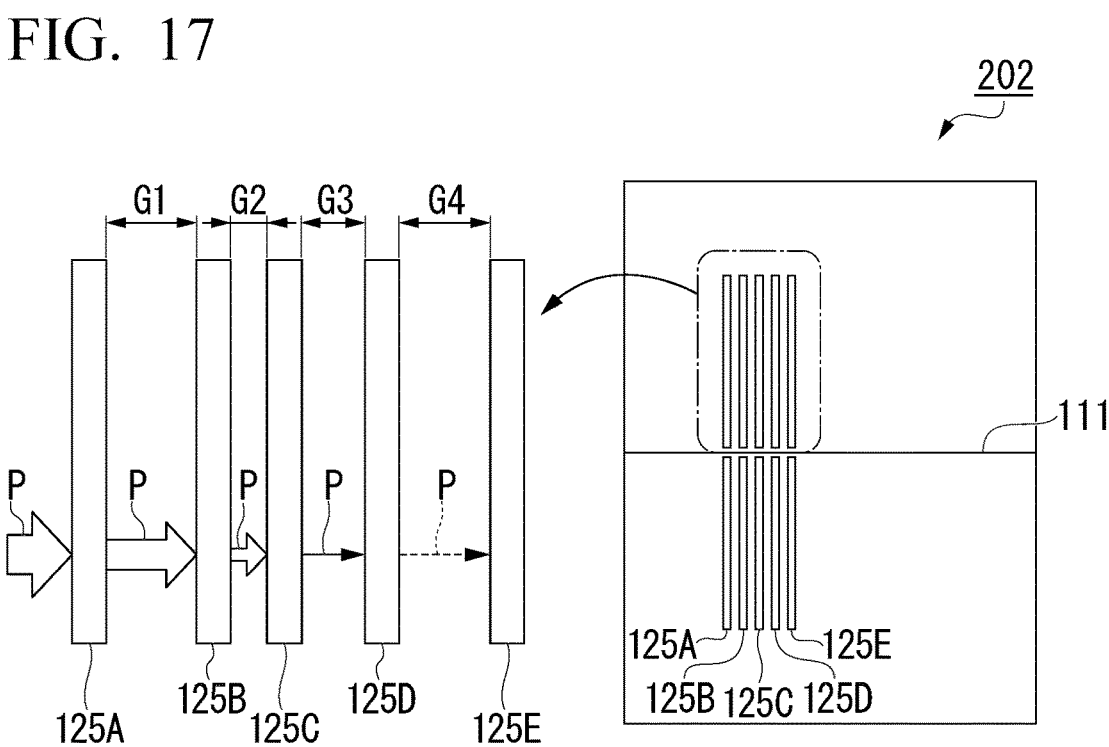
FIG. 17 is a plan view of a light modulation output part according to another embodiment from above.

FIG. 17 is a plan view of the light modulation output part according to the other embodiment from above.

The light modulation output part of the embodiment is formed to have a plurality of groove sections (in the embodiment, five) 125A, 125B, 125C, 125D and 125E, which are separated from each other on both sides of the optical waveguide 111 in the extension direction of the optical waveguide 111. The groove sections 125A to 125E are formed in the same rectangle shape (rectangular shape) when the one surface 140a (see FIG. 14) of the substrate 140 is seen in a plan view.

In the embodiment, the groove sections 125A to 125E are formed such that an interval G1 between the groove section 125A and the groove section 125B, an interval G2 between the groove section 125B and the groove section 125C, an interval G3 between the groove section 125C and the groove section 125D, and an interval G4 between the groove section 125D and the groove section 125E are all different from each other.

In addition, a sum of intervals between the arbitrary groove sections 125A to 125E is different from a sum of intervals between the other arbitrary groove sections 125A to 125E. For example, the interval G1+the interval G3 has a value different from the sum of the interval G2+the interval G4. In addition, for example, the interval G2+the interval G3+the interval G4 has a value different from the sum of the interval G1+the interval G3+the interval G4.

While there is a concern that the regularly reflected stray light is intensified when the plurality of groove sections 125A to 125E are regularly arranged at equal intervals, by varying the interval between the groove sections 125A to 125E adjacent to each other like the embodiment, the stray light can be prevented from being regularly reflected and strengthened, and the stray light P can be reliably absorbed and blocked by the plurality of groove sections 125A to 125E and the light absorption layer 116 that covers them.

Next, a light modulation output part 203 of still another embodiment will be described. Further, in the following embodiment, the same components as the above-mentioned embodiment are designated by the same reference signs and overlapping description thereof will be omitted.

Figure 18:
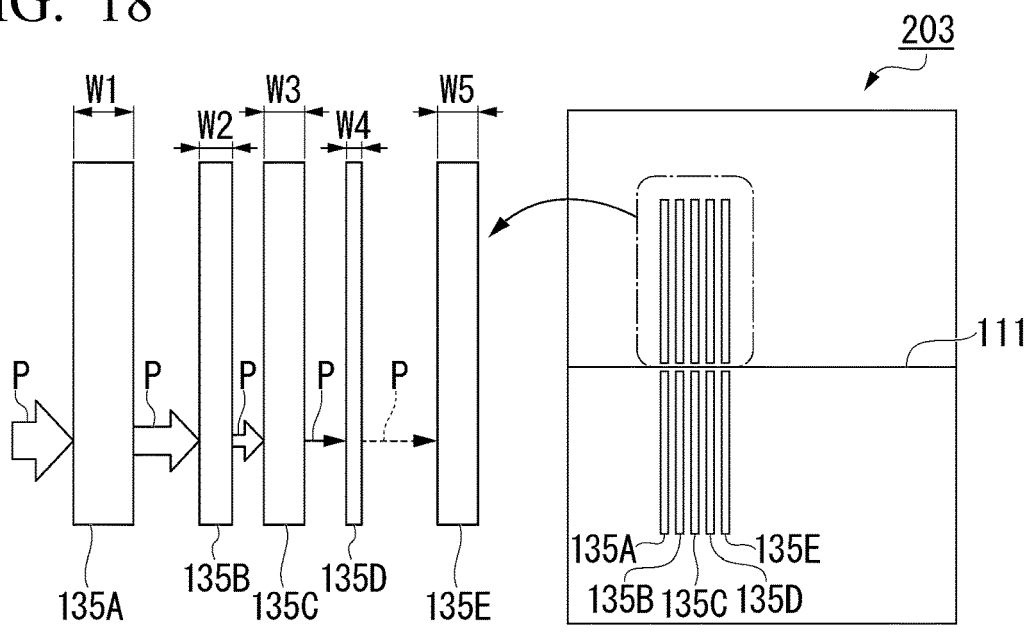
FIG. 18 is a plan view of a light circuit device according to still another embodiment from above.

FIG. 18 is a plan view of a light modulation output part of still another embodiment from above.

The light circuit device 30 of the embodiment has a plurality of groove sections (in the embodiment, five) 135A, 135B, 135C, 135D and 135E formed at equal intervals on both sides of the optical waveguide 111 in the extension direction of the optical waveguide 111. Each of the groove sections 135A to 135E is formed in a rectangle shape (rectangular shape) when the one surface 140a (see FIG. 14) of the substrate 140 is seen in a plan view.

In the embodiment, the groove sections 135A to 135E are formed to have widths W1 to W5 of the groove section 135A to the groove section 135E in the extension direction of the optical waveguide 111, which are all different from each other.

In addition, a sum of the widths W1 to W5 of the arbitrary groove sections 135A to 135E is different from a sum of the widths W1 to W5 of the other arbitrary groove sections 135A to 135E. For example, the width W1+the width W3 has a value different from a sum of the width W2+the width W4. In addition, for example, the width W1+the width W3+width W5 has a value different from a sum of the width W1+the width W2+the width W4.

While there is a concern that the stray light is regularly reflected and strengthened when the widths of the plurality of groove sections 135A to 135E are equal to each other, like the embodiment, the stray light can be prevented from being regularly reflected and strengthened by varying the widths of the groove sections 135A to 135E adjacent to each other, and the stray light P can be reliably absorbed and blocked by the plurality of groove sections 135A to 135E and the light absorption layer 116 that covers them.

Next, a light modulation output part 204 of still another embodiment will be described. Further, in the following embodiment, the same components as the above-mentioned embodiment are designated by the same reference signs and overlapping description thereof will be omitted.

Figure 19:
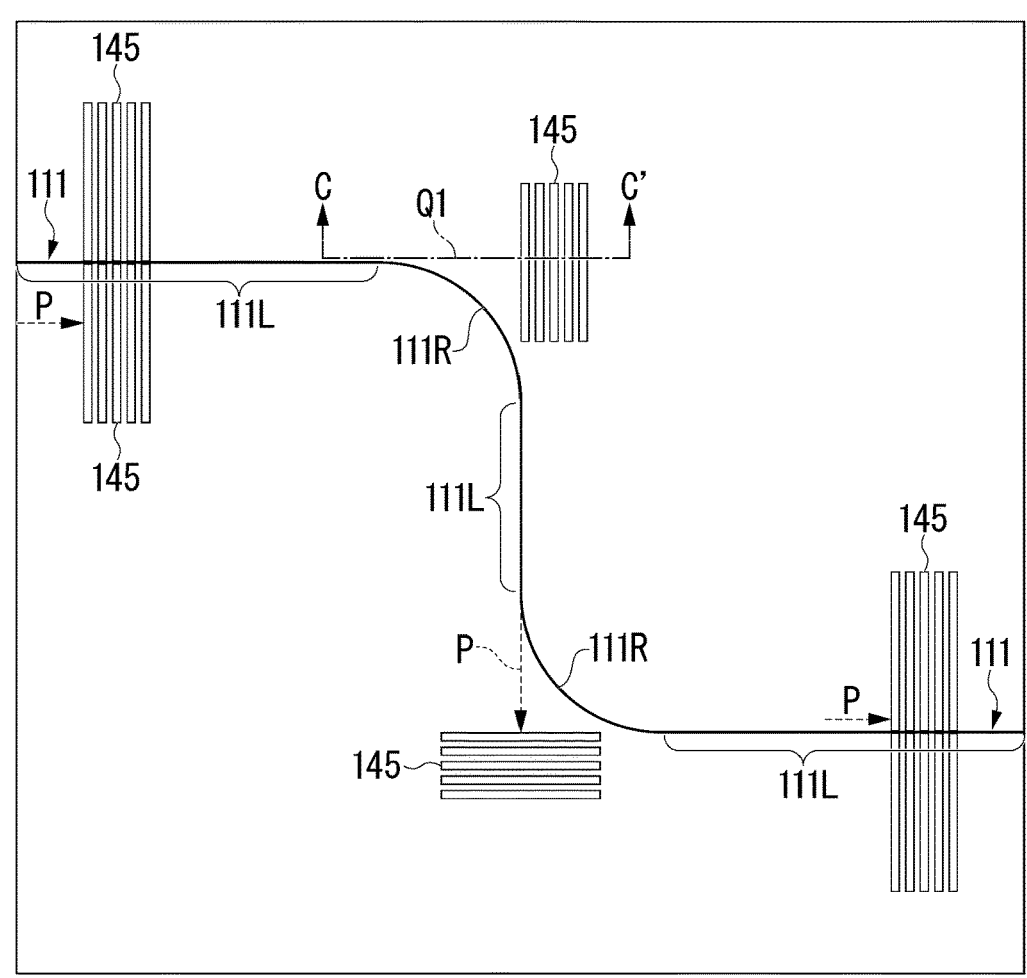
FIG. 19 is a plan view of the light circuit device according to yet another embodiment from above.
Figure 20:
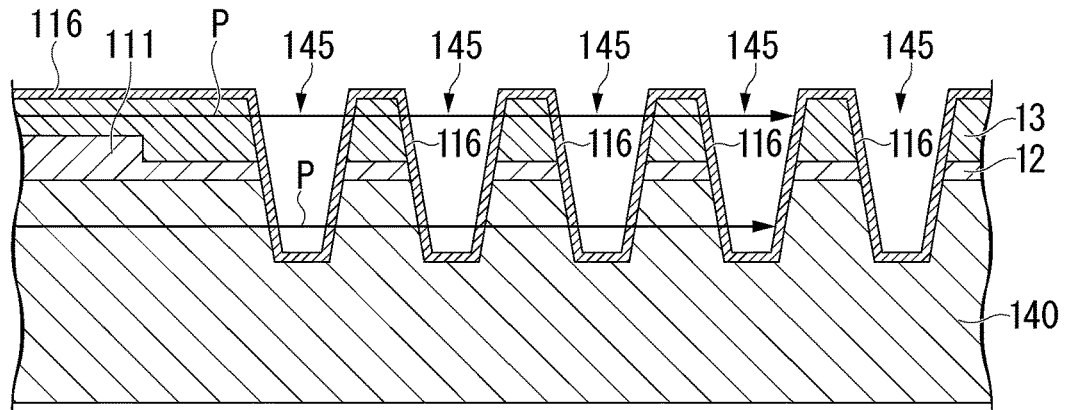
FIG. 20 is a cross-sectional view along line C-C' in FIG. 19.

FIG. 19 is a plan view of the light modulation output part according to still another embodiment from above. FIG. 20 is a cross-sectional view along line C-C' of FIG. 19.

In the light modulation output part 204 of the embodiment, the optical waveguide 111 is constituted by a straight section 111L extending linearly, and a curved section 111R curved from the straight section 111L.

Then, in two straight sections 111L, a plurality of groove sections 145, 145 . . . are formed at both sides of the straight sections 111L, and inner surfaces (side surfaces, bottom surfaces) of the groove sections 145 are covered with the light absorption layer 116.

Further, the plurality of groove sections 145, 145 . . . are also formed on a virtual extension line Q1 of the straight section 111L extending in a direction separated from a curve direction of the curved section 111R in a connecting portion between the straight section 111L and the curved section 111R of the optical waveguide 111, and the inner surfaces (side surfaces, bottom surfaces) of the groove sections 145 are covered with the light absorption layer 116.

According to the light modulation output part 204 of the above-mentioned configuration, when the light propagating through the optical waveguide 111 enters the curved section 111R from the straight section 111L, the stray light P propagating through the substrate 140 or the buffer layer 32 goes straight as it is without curving at the formation position of the curved section 111R with respect to the cover along the curved section 111R. Then, the stray light P that goes straight is absorbed by the light absorption layer 116 that covers the plurality of groove sections 145, 145 . . . formed on the virtual extension line Q1 of the straight section 111L. Accordingly, according to the light modulation output part 204 of the embodiment, the stray light P that goes straight at a formation position of a curved section 11R of the optical waveguide 111 can prohibit alignment of the light detector and prevent occurrence of an increase in connecting loss or occurrence of poor connection in, for example, the alignment process, without emission to the outside of the light modulation output part 204.

Next, a light modulation output part 205 of still another embodiment will be described. Further, in the following embodiment, the same components as the above-mentioned light modulation output part 204 are designated by the same reference signs and overlapping description thereof will be omitted.

Figure 21:
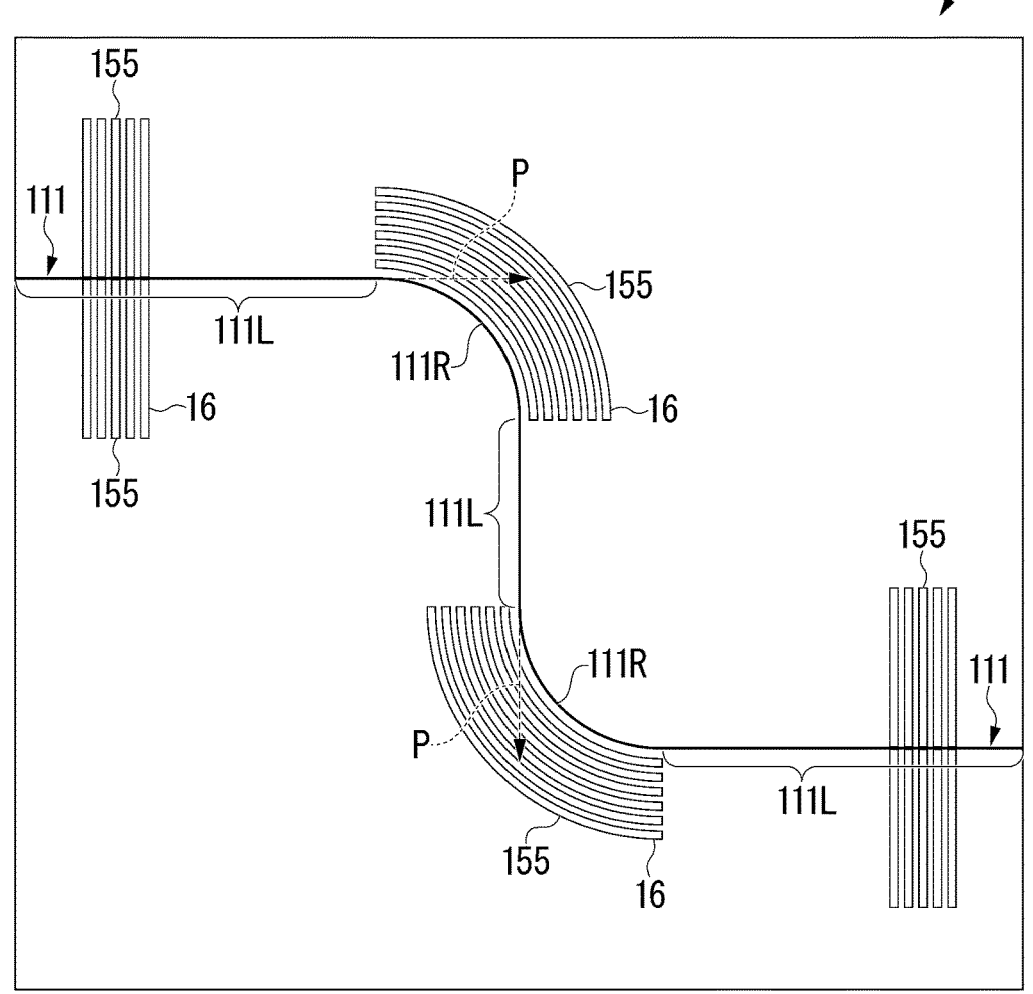
FIG. 21 is a plan view of the light circuit device according to still another embodiment from above.

FIG. 21 is a plan view of the light modulation output part 205 from above.

In the light modulation output part 205 of the embodiment, the optical waveguide 111 is constituted by the straight section 111L extending linearly, and the curved section 111R curved from the straight section 111L.

Then, in the two straight sections 111L, a plurality of groove sections 155, 155 . . . are formed at both sides of the straight section 111L, and inner surfaces (side surfaces, bottom surfaces) of the groove sections 155 are covered with the light absorption layer 116.

Further, the plurality of curved groove sections 155, 155 . . . are formed on a curved outer circumference of the curved section 111R of the optical waveguide 111, and the inner surfaces (side surfaces, bottom surfaces) of the groove sections 155 are covered with the light absorption layer 116.

According to the light modulation output part 205 of the above-mentioned configuration, when the light propagating the optical waveguide 111 enters the curved section 111R from the straight section 111L, the stray light P propagating through the substrate 110 or the buffer layer 32 goes straight as it is without being curved at a formation position of the curved section 111R with respect to the curving along the curved section 111R. Then, the stray light P that goes straight is absorbed by the light absorption layer 116 formed along a curved outer circumference of the curved section 111R and covering the plurality of curved groove sections 155, 155 . . . .

As an example, according to the configuration of the embodiment, for example, when the wavelength of the light entering the optical waveguide 111 is 520 nm and the light absorption layer 116 is formed of a Si film, since the light absorption coefficient of Si is 1.35×105/cm, even though the thickness of the light absorption layer 116 is 100 nm, since the five groove sections 155 are arranged, the stray light can be attenuated to about 26% of intensity before incidence while the stray light passes through the entire light absorption layer 116 formed on each of the five groove sections 155.

Accordingly, according to the light modulation output part 205 of the embodiment, the stray light P that goes straight at a formation position of the curved section 111R of the optical waveguide 111 can prohibit alignment of the light detector and prevent an increase in connecting loss or occurrence of poor connection in, for example, the alignment process without emitted to the outside of the light modulation output part 204.

Visible Light Modulation Device (Second Embodiment)

A visible light modulation device according to a second embodiment is common to the visible light modulation device according to the first embodiment in that this was obtained as a result of considering miniaturization that can be mounted on AR glass, VR glass, or the like, as a top priority compared to the visible light modulation device according to the first embodiment.

Meanwhile, the visible light modulation device according to the second embodiment is common to the visible light modulation device according to the first embodiment in that the optical engine can be miniaturized when the optical engine is assembled, and distinguished from the visible light modulation device according to the first embodiment in that it came up with the idea with the highest priority on miniaturization of the optical system included in the optical engine.

Specifically, the visible light modulation device according to the second embodiment is an essential configuration having a multiplexing part configured to multiplex light with a plurality of wavelengths that propagates through the light modulation output part.

Figure 23:
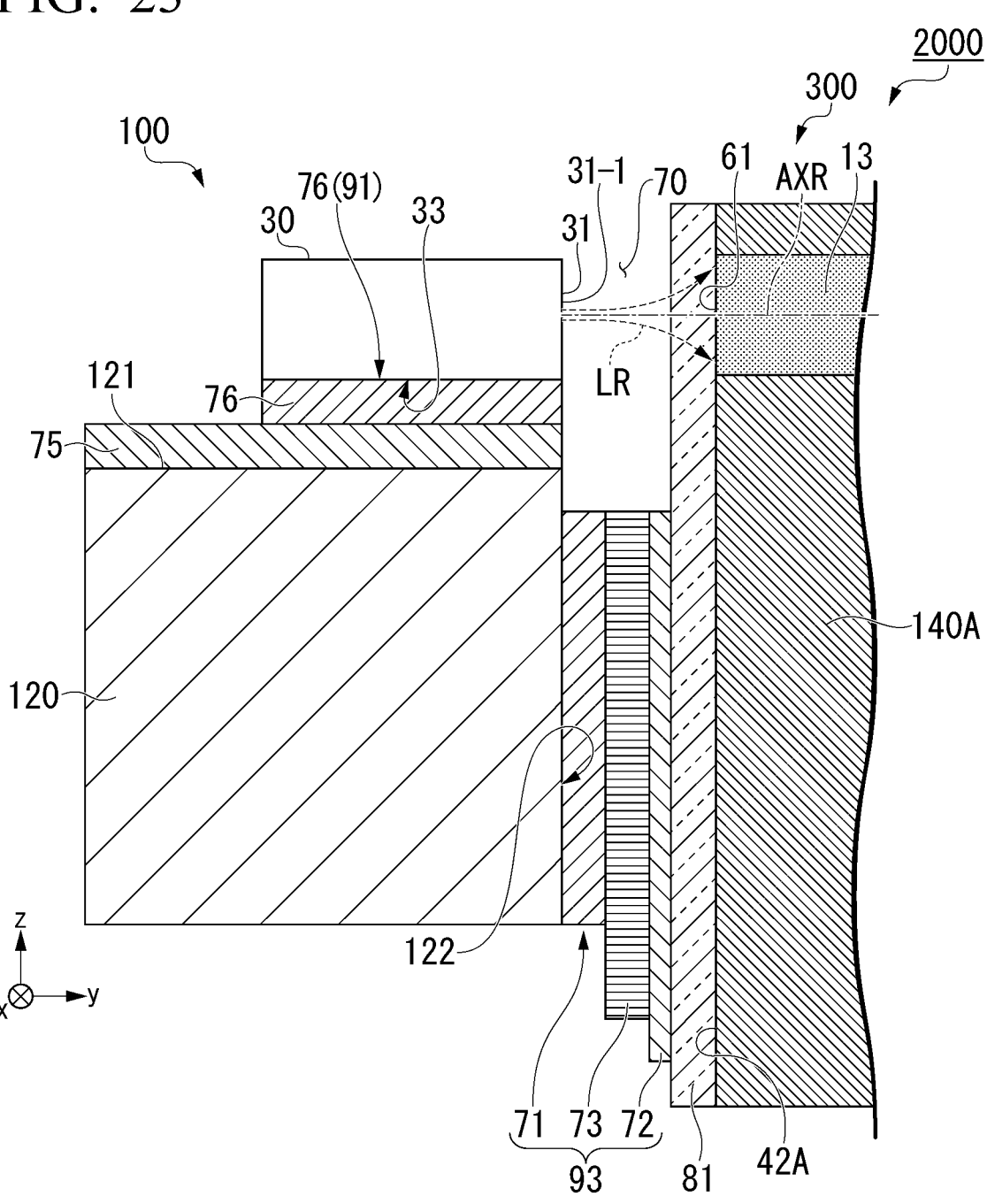
FIG. 23 is a schematic cross-sectional view along line Y-Y in FIG. 22.
Figure 28A:
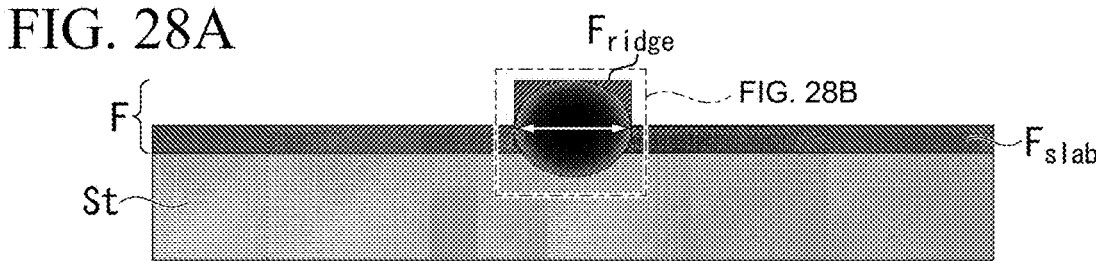
FIG. 28($a$) is a conceptual view for describing a modulator in which a portion obtained by modifying a part of a single crystal of bulk lithium niobate is used as an optical waveguide, and FIG. 28($b$) is a conceptual view for describing a modulator in which a convex section obtained by processing a single crystal lithium niobate film is used as an optical waveguide.
Figure 28B:
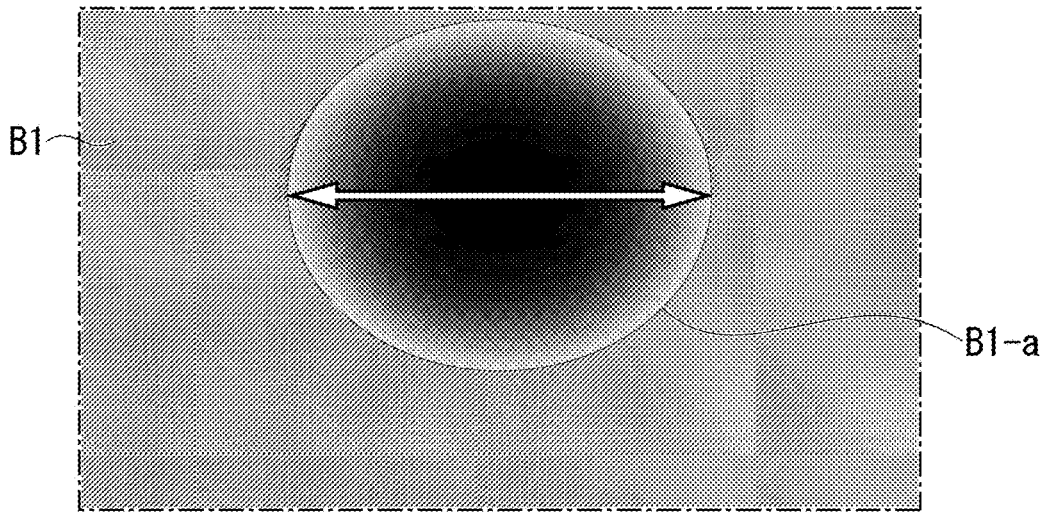

In the visible light modulation device according to the second embodiment, like the first embodiment as the light modulation output part, a configuration having a Mach-Zehnder type optical waveguide obtained by processing a lithium niobate film in a convex shape can be used, and further, a configuration in which a portion obtained by modifying a part of a single crystal substrate of bulk lithium niobate shown in FIG. 28(*a*) is provided as the optical waveguide can be used. A visible light modulation device 2000 according to the second embodiment shown in FIG. 22 and FIG. 23 is an example employing a configuration in which a portion obtained by modifying a part of a single crystal substrate of bulk lithium niobate is provided as the optical waveguide.

Figure 22:
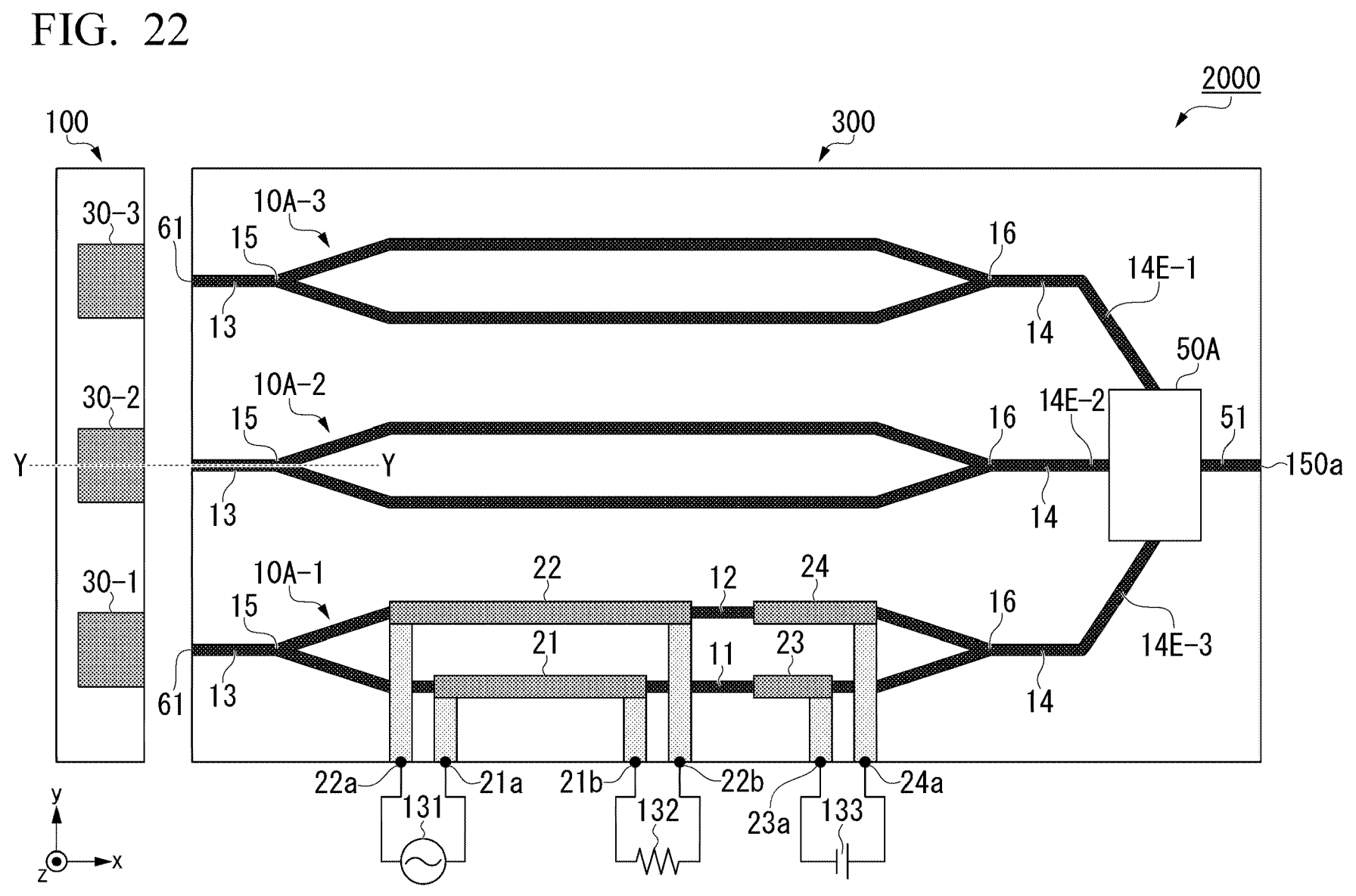

FIG. 22 is a schematic plan view corresponding to FIG. 6 of the visible light modulation device according to the first embodiment. FIG. 23 is a schematic cross-sectional view corresponding to FIG. 3 of the visible light modulation device according to the first embodiment. Hereinafter, the same components as the visible light modulation device according to the first embodiment are designated by the same reference signs and description thereof may be omitted. In addition, the components with the same reference signs as the above-mentioned drawings in FIG. 22, FIG. 23 are the same components.

The visible light modulation device 2000 shown in FIG. 22 includes the light source part 100 having the three optical semiconductor devices 30-1, 30-2 and 30-3 configured to emit light with a visible light wavelength of 400 nm to 700 nm, and a light modulation output part 300 having three Mach-Zehnder type optical waveguides 10A-1, 10A-2 and 10A-3 corresponding to the three optical semiconductor devices 30-1, 30-2 and 30-3, respectively, into which light emitted from the optical semiconductor devices 30-1, 30-2 and 30-3 enters, and having a multiplexing part 50A configured to multiplex modulation light from the three Mach-Zehnder type optical waveguides 10A-1, 10A-2 and 10A-3.

The light modulation output part 300 has a lithium niobate single crystal substrate 140A, the three Mach-Zehnder type optical waveguides 10A-1, 10A-2 and 10A-3 formed on the lithium niobate single crystal substrate 140A, the electrodes 21 and 22 provided on the lithium niobate single crystal substrate 140A, and a buffer layer (not shown) interposed between the lithium niobate single crystal substrate 140A and the electrodes 21 and 22.

As shown in FIG. 23, the sub-carrier 120 is directly bonded to the substrate 140A via a metal layer 93 (a first metal layer 71, a second metal layer 72, a third metal layer 73). In the embodiment, a side surface (a first side surface) 122 of the sub-carrier 20 facing the substrate 140A and a side surface (a second side surface) 42A of the substrate 140A facing the sub-carrier 120 are connected to each other via the first metal layer 71, the second metal layer 72, the third metal layer 73, and an anti-reflection film 81. A melting point of a metal layer 75 is higher than a melting point of the third metal layer 73.

As shown in FIG. 23, the sub-carrier 120 is connected to the substrate 140A via the third metal layer 93 and the anti-reflection film 81.

Next, a method of manufacturing the visible light modulation device 2000 will be described in brief. The method of manufacturing the visible light modulation device 2000 described below can be appropriately applied to the method of manufacturing the visible light modulation device 1000.

First, the LD 30 of a bare chip is mounted on an upper surface 121 of the sub-carrier 120 through a known method. For example, after forming the metal layer 75 on the upper surface 121 of the sub-carrier 120 through sputtering, deposition, or the like, a metal layer 76 is formed on a lower surface 33 of the LD 30 through sputtering, deposition, or the like. After forming the metal layer on the upper surface 121 of the sub-carrier 120 through sputtering, deposition, or the like, the metal layer 75 may be formed on the metal layer 76 through sputtering, deposition, or the like.

Next, for example, a laser beam is radiated to the sub-carrier 120. Only the sub-carrier 120 is heated by radiation of the laser beam not to be melted and deformed, the metal layers 75 and 76 are softened or melted by heat transfer from the sub-carrier 120, and a first metal layer 91 is formed and then cooled. The LD 30 is joined to the upper surface 121 of the sub-carrier 120 via the metal layers 75 and 76 by these works. After that, the metal layer 71 is formed on a side surface 22 of the sub-carrier 120 through sputtering, deposition, or the like.

The light modulation output part 300 such as the Mach-Zehnder type optical waveguide, multiplexing part or the like is formed on the substrate 140A by a known process.

Next, an emission surface 31-1 of the LD 30-1 and incidence surfaces 61 of optical waveguides (core) 10A-1, 10A-2 and 10A-3, which correspond to each other, overlap each other in the x direction and the z direction, and face each other at a predetermined interval in the y direction. An optical axis of each color light emitted from the LD 30 substantially overlaps an axis of the incidence surface 61 of the corresponding core.

Next, the laser beam is radiated to the sub-carrier 120, the metal layers 71, 72 and 73 are softened and melted by heat transfer from the sub-carrier 120, the third metal layer 93 is formed, a relative position between the LD 30 and the light modulation output part 300 is adjusted, and in this state, the sub-carrier 120 on which the LD 30 is mounted is joined to the substrate 140A on which the light modulation output part 300 is formed.

When the LD 30 and the sub-carrier 120 are bonded, lasers for laser beam radiation are disposed on both sides of the sub-carrier 120 in the x direction. The light emitted from the lasers on both sides are applied to the sub-carrier 120 to heat it, and only the sub-carrier 120 is heated not to be melted and deformed. Simultaneously, each color light is emitted from the LD 30, emission intensity is detected, and emission intensity of three color lights emitted from a core 10A of the light modulation output part 300 is detected.

As shown in FIG. 23, when an interval between an emission surface 31 and the incidence surface 61 in the y direction is changed by a value of a micron order and emission intensity with respect to the emission intensity is set as light use efficiency (%), light use efficiency is decreased as the interval is increased. Adjustment of the interval S and the LD 30 can be performed u sing a known device having a function of active alignment.

When the active alignment and the gap control and heating of the sub-carrier 120 are performed, each of the metal layers 71, 72 and 73 between the emission surface 31 and the incidence surface 61 of the LD 30 disposed at an optimal position are thinner than each of the metal layers, which are not sandwiched between the emission surface 31 of the LD 30 and the incidence surface 61 of the core 10A due to alloying of the metal layer 73 and slight heat shrinkage. The sub-carrier 120 is cooled by stopping heating of the sub-carrier 120 by the laser, and a position of the LD 30 is fixed.

The visible light modulation device 2000 according to the embodiment as described above includes the sub-carrier 120, the LD 30 provided on the upper surface 121 of the sub-carrier 120, and the light modulation output part 300 disposed to enable the light emitted from the LD 30 to enter.

According to the above-mentioned configuration, since the emission surface 31 of the LD 30 and the side surface 122 of the sub-carrier 120 are located at substantially the same position in the y direction, the LD 30 does not protrude forward from the sub-carrier 120 in the y direction, and a decrease in bonding intensity of the LD 30 to the sub-carrier 120 can be prevented. Since the emission surface 31 of the LD 30 and the side surface 22 of the sub-carrier 120 are located at substantially the same position in the y direction, a size of the third metal layer 93 in the y direction may be substantially the same as the interval between the emission surface 31 of the LD 30 and the incidence surface 61 of the core 10A of the light modulation output part 300 corresponding to the LD 30 in the y direction. As a result, the metal layers 71, 72 and 73 are softened and melted by heat transfer from the sub-carrier 120, a relative position between the LD 30 and the light modulation output part 300 is adjusted, and during a work of joining the sub-carrier 120 to the substrate 140A, interval control (i.e., gap control) of the core 10A of the light modulation output part 300 with the incidence surface 61 in the y direction can be easily and accurately performed. Since the emission surface 31 of the LD 30 and the side surface 22 of the sub-carrier 120 are located at substantially the same position in the y direction, the light emitted from the emission surface 31 can be applied to the sub-carrier 120 to prevent a decrease in coupling efficiency of the light to the core 10A of the light modulation output part 300. Accordingly, it is possible to provide the visible light modulation device 2000 with high reliability.

In the visible light modulation device 2000, the sub-carrier 120 and the LD 30 are connected via the first metal layer 91 having the metal layers 75 and 76. As a result, in manufacture of the visible light modulation device 2000, after the metal layers 75 and 76 are melted or softened to bond the LD 30 and the sub-carrier 120, when the metal layers 71, 72 and 73 are melted and softened to bond the sub-carrier 120 and the substrate 140A, it is possible to prevent the metal layer 75 from remelting and a relative displacement between the LD 30 and the sub-carrier 120 from occurring. Since occurrence of the relative displacement between the LD 30 and the sub-carrier 120 is prevented, positional accuracy between the LD 30 and the light modulation output part 300 connected via the sub-carrier 120 can be increased, and the visible light modulation device 2000 with high reliability can be provided.

Bonding between the sub-carrier 120 and the LD 30 due to the metal layers 75 and 76 caused by alloying is resistant to heat, and difficult to be released even when a surrounding ambient temperature increases due to a process such as wire bonding or the like. For example, when the LD 30 and a power supply (not shown) are connected by a wire on the upper surface 121 of the sub-carrier 120 using a method such as wire bonding or the like, a state in which boding between the sub-carrier 120 and the LD 30 is appropriately maintained is maintained. That is, when the wire bonding is performed, the LD 30 and the sub-carrier 120 are not separated, and the LD 30 is maintained at an optimal position of the sub-carrier 120. As a result, the visible light modulation device 2000 can demonstrate the desired light use efficiency and optical properties, and reliability of the visible light modulation device 2000 can be improved.

In the visible light modulation device 2000, the gap 70 is formed between the emission surface 31 of the LD 30 and the incidence surface 61 into which each color light enters in the light modulation output part 300. The visible light modulation device 2000 is configured such that each color light emitted from the emission surface 31 of the LD 30 propagates through the gap 70 in the y direction and enters the incidence surface 61 of the core 10A of the light modulation output part 300. Each color light emitted from the emission surface 31 of the LD 30 can easily enter the core 10A of the light modulation output part 300 while predetermined coupling efficiency is satisfied by the above-mentioned configuration, and the visible light modulation device 2000 with high reliability can be provided.

Even in the visible light modulation device 2000, like the visible light modulation device 1000, the wavelengths of the lights emitted from the plurality of optical semiconductor device may be different from each other.

Even in the visible light modulation device 2000, like the visible light modulation device 1000, the Mach-Zehnder type optical waveguides 10A (10A-1, 10A-2, 10A-3) may have curved sections.

Even in the visible light modulation device 2000, like the visible light modulation device 1000, the multiplexing part 50A may be constituted by any one selected from the group consisting of a MMI type multiplexer, a Y type multiplexer, and a directional coupler.

Even in the visible light modulation device 2000, like the visible light modulation device 1000, a controller configured to control a current value input to each of the plurality of optical semiconductor devices may be provided such that a peak output of each wavelength of the light emitted to the outside through the plurality of Mach-Zehnder type optical waveguides 10A (10A-1, 10A-2, 10A-3) has a predetermined ratio.

Even in the visible light modulation device 2000, like the visible light modulation device 1000, the plurality of Mach-Zehnder type optical waveguides 10A (10A-1, 10A-2, 10A-3) may be configured such that a peak output of each wavelength in the light emitted to the outside through the plurality of Mach-Zehnder type optical waveguides 10A (10A-1, 10A-2, 10A-3) has a predetermined ratio using a current value input to each of the plurality of optical semiconductor devices 30-1, 30-2 and 30-3 as a constant value.

Even in the visible light modulation device 2000, like the visible light modulation device 1000, a length of an optical waveguide from an incident end to an output end of each of the plurality of Mach-Zehnder type optical waveguides 10A (10A-1, 10A-2, 10A-3) can be made as short as the Mach-Zehnder type optical waveguide through which light with a short wavelength propagates.

Even in the visible light modulation device 2000, like the visible light modulation device 1000, a light absorption part formed of a material that is absorptive for a wavelength of light propagating through the optical waveguide from the incident end to the output end in each of the plurality of Mach-Zehnder type optical waveguides 10A (10A-1, 10A-2, 10A-3) is provided, and a length of the optical waveguide of the light absorption part in the length direction can be made as short as the Mach-Zehnder type optical waveguide through which the light with a short wavelength propagates.

Even in the visible light modulation device 2000, like the visible light modulation device 1000, a curved part having a curvature is provided in the optical waveguide from the incident end to the output end in each of the plurality of Mach-Zehnder type optical waveguides 10A (10A-1, 10A-2, 10A-3), and a configuration with a curvature as great as the Mach-Zehnder type optical waveguide through which the light with a short wavelength propagates, and a short length of the curved part, can be provided.

Even in the visible light modulation device 2000, like the visible light modulation device 1000, a peak output of each wavelength of the light emitted to the outside through the plurality of Mach-Zehnder type optical waveguides 10A (10A-1, 10A-2, 10A-3) may have the same intensity.

Even in the visible light modulation device 2000, like the visible light modulation device 1000, a groove section reaching the substrate 140A on which the Mach-Zehnder type optical waveguide 10A is formed from the surface of the device may be provided in a portion of the light modulation output part 300 except the plurality of Mach-Zehnder type optical waveguides 10A (10A-1, 10A-2, 10A-3), and a light absorption layer may be provided on at least a bottom surface and side surfaces of the groove section.

Even in the visible light modulation device 2000, like the visible light modulation device 1000, the light absorption layer may be formed to fill the entire groove section.

Even in the visible light modulation device 2000, like the visible light modulation device 1000, a plurality of groove sections may be formed separately from each other along one surface of a substrate.

Even in the visible light modulation device 2000, like the visible light modulation device 1000, the plurality of Mach-Zehnder type optical waveguides 10A (10A-1, 10A-2, 10A-3) may have a curved section curved from a straight section, and the groove section may be disposed to cross a virtual extension line of the straight section.

Even in the visible light modulation device 2000, like the visible light modulation device 1000, the optical waveguide may have a curved section curved from a straight section, and the groove section may be formed to curve and extend along the curved section.

(Optical Engine)

In the specification, the optical engine is a device including a plurality of light sources, an optical system including a multiplexing part configured to multiplex a plurality of lights emitted from the plurality of light source to a single beam, an optical scanning mirror configured to reflect the light emitted from the optical system by changing an angle thereof to display an image.

Figure 24:
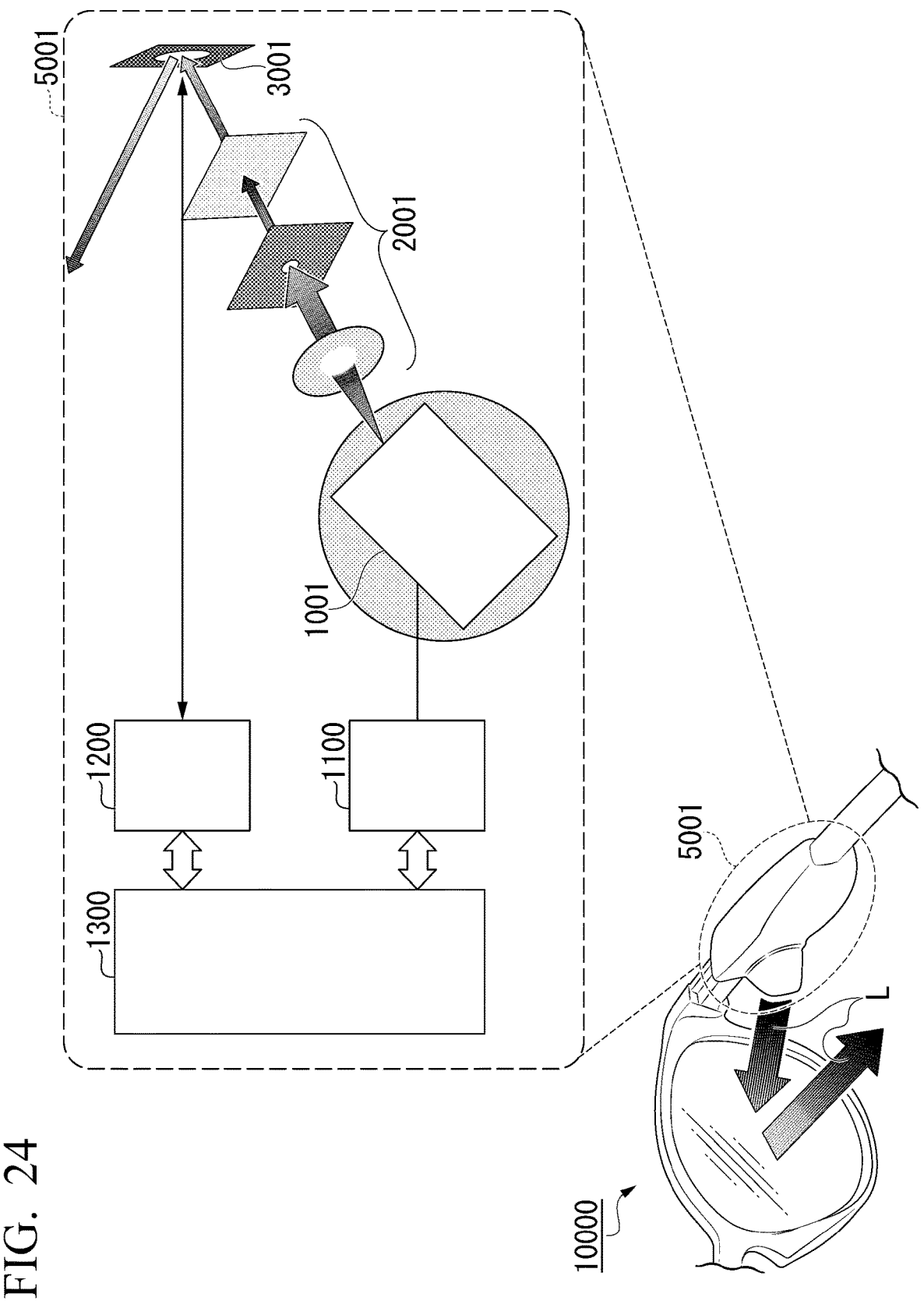
FIG. 24 is a conceptual view for describing an optical engine according to a third embodiment.

FIG. 24 is a conceptual view for describing an optical engine 5001 according to the embodiment. As shown, the optical engine 5001 is mounted on spectacles 10000. Reference sign L designates image display light.

The optical engine 5001 has a visible light modulation device 1001 and an optical scanning mirror 3001. As the visible light modulation device 1001 included in the optical engine 5001, any one of the visible light modulation device according to the first embodiment and the visible light modulation device according to the second embodiment may be used.

The visible light modulation device 1001 includes RGB light sources, and a multiplexing part configured to multiplex RGB lights emitted from the RGB light sources as a single beam.

The optical scanning mirror 3001 is, for example, a MEMS mirror. In order to project a 2-D image, a 2-axis MEMS mirror configured to vibrate to change the angle in the horizontal direction (X direction) and the vertical direction (Y direction) and reflect the laser beam is preferable.

The optical engine 5001 is an optical system configured to optically process the laser beam emitted from the visible light modulation device 1001, and includes a collimator lens 2001$a$, a slit 2001$b$, and an ND filter 2001$c$. The optical system is an example, and may have another configuration.

The optical engine 5001 has a laser driver 1100, an optical scanning mirror driver 1200, and a video controller 1300 configured to control these drivers.

Figure 25A:
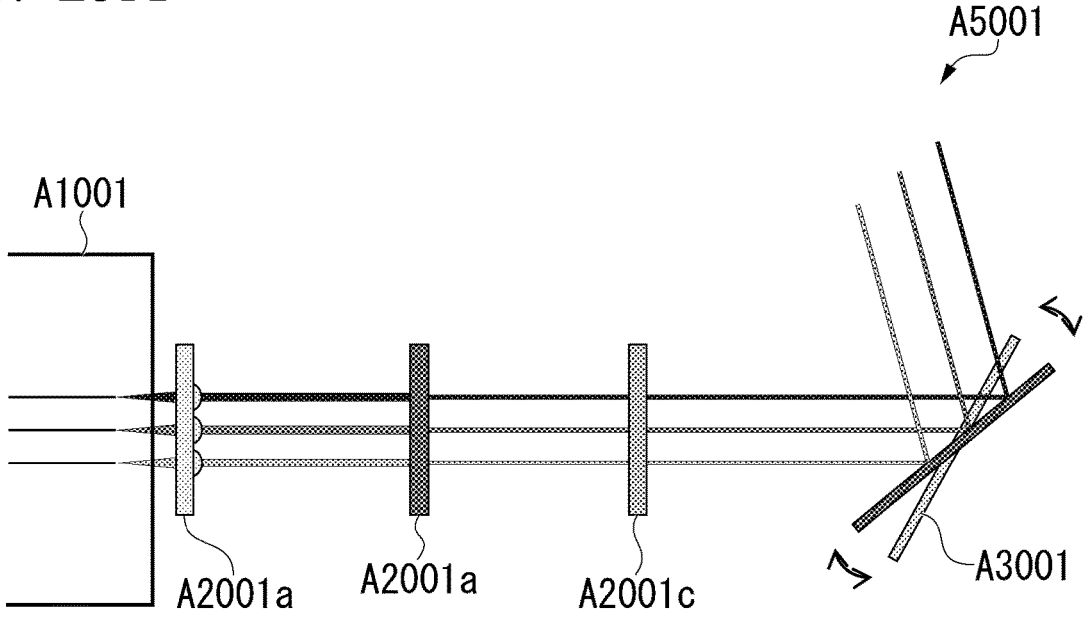
FIG. 25A is a view schematically showing an optical engine having no multiplexer in a modulation device.
Figure 25B:
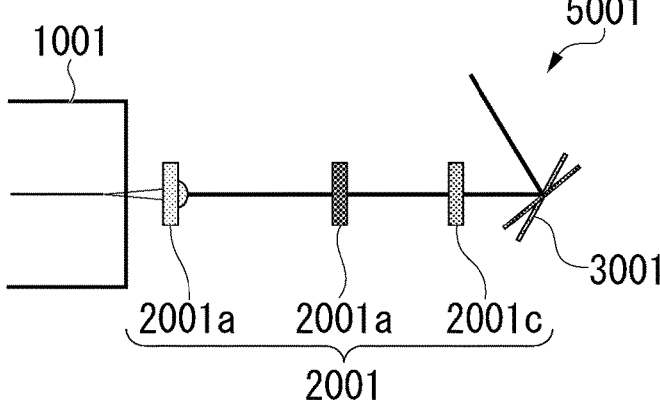
FIG. 25B is a view schematically showing an optical engine according to the embodiment having a multiplexing part in the visible light modulation device.

FIG. 25A is a view schematically showing an optical engine A5001 (see Cited Literature 2), which does not include a multiplexing part or a multiplexer in a modulation device A1001. FIG. 25B is a view schematically showing the optical engine 5001 according to the embodiment having the multiplexing part in the visible light modulation device 1001.

In the optical engine 5001 shown in FIG. 25B, since the three wavelengths are multiplexed and emitted from the visible light modulation device 1001, each of the optical parts is one and can be miniaturized, and thus, it is easy to increase the resolution because white is made with one beam spot.

On the other hand, in the optical engine A5001 shown in FIG. 25A, since the multiplexing part or the multiplexer is not provided in the modulation device A1001, three color beam spot are required to emit white, and the beam spots become large, making it difficult to increase the resolution. In addition, since the three color beam spots are required, design of a collimate lens A2001$a$, a slit (or an aperture) A2001$b$, an ND filter A2001$c$, and a 2-axis MEMS mirror A3001 is increased, and the number of pieces is required, making it unsuitable for miniaturization.

EXAMPLES

Hereinafter, while examples of the present disclosure will be exemplified, the present disclosure is not limited to the following examples.

Figure 26A:
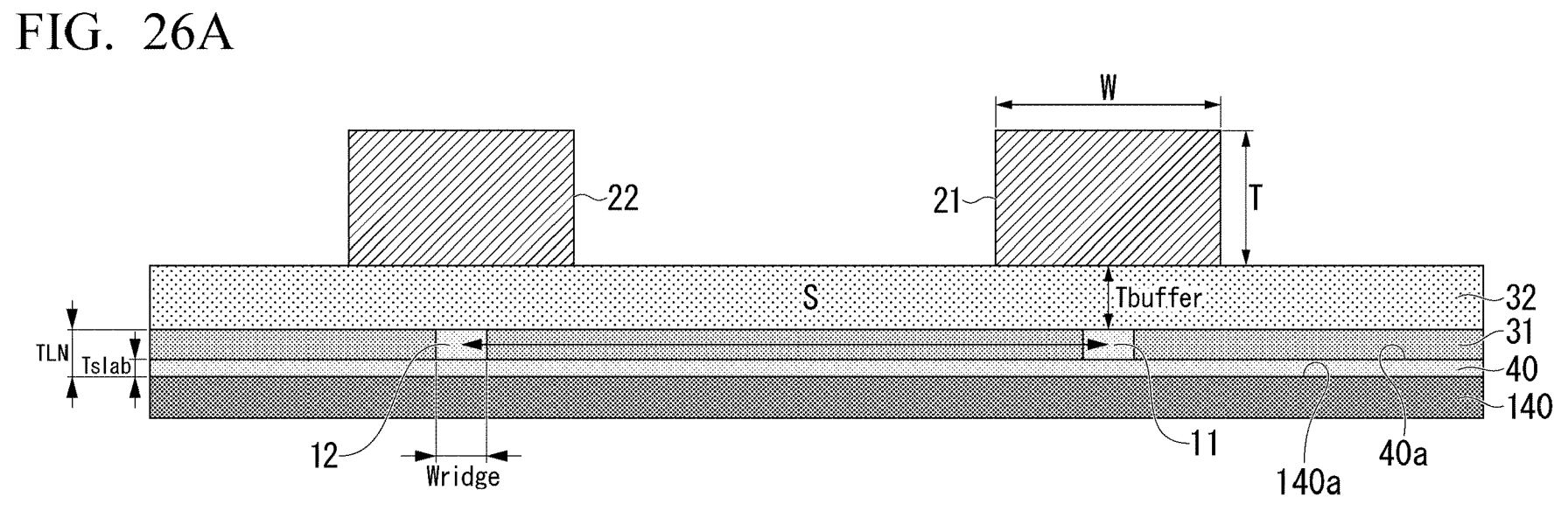
Figure 26B:
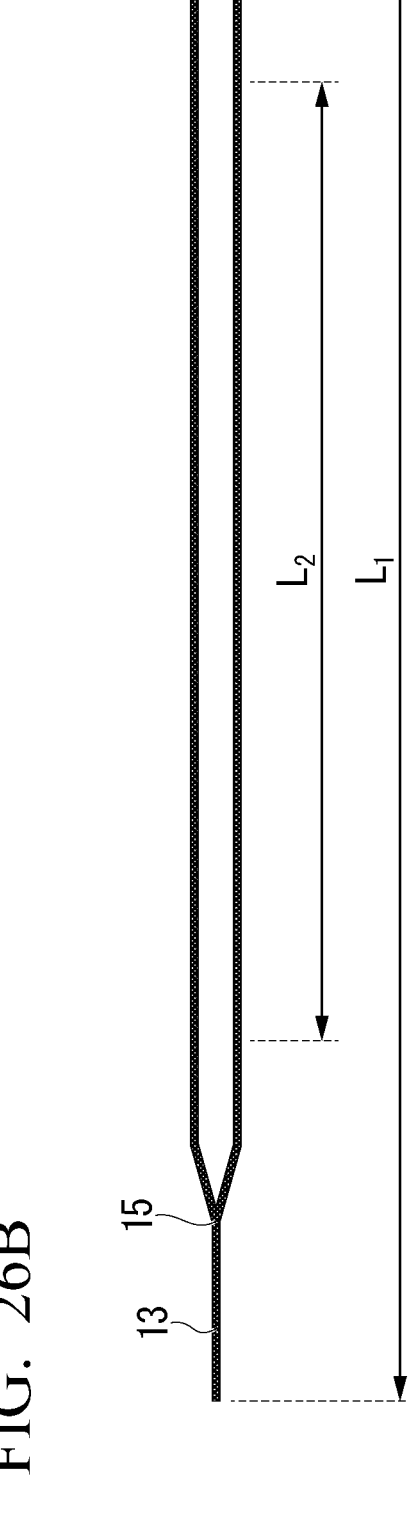
FIG. 26B is a plan view.

A Mach-Zehnder type optical waveguide of a configuration shown in FIGS. 26A and 26B was fabricated.

A material of the substrate 140 was sapphire. A lithium niobate film with a film thickness $T_{LN}$ of 0.7 µm was formed on a surface 140$a$ of the substrate 140 through sputtering. Next, ridges (optical waveguides) 11 and 12 were formed through mask formation by resist and dry etching processing using Ar plasma. A junction part 15 and a multiplexing part 16 were an MMI type. A cross-sectional shape of the ridge was a rectangle, a ridge width $W_{ridge}$ was 0.8 µm, and ridge height $T_{ridge}$ was 0.5 µm. Next, a $SiO_2$ film was formed to sufficiently fill the ridges 11 and 12, and then, an upper surface of the ridge was polished and planarized by CMP. A buffer layer 32 of SiInO with a film thickness $T_{buffuer}$ of 0.6 µm was formed through deposition. Next, planarization was performed by CMP. Electrodes 21 and 21 with a width W of 3.5 µm and a height T of 2 µm were formed by a photograph process and a plating process.

The other parameters are as follows.

Distance S between ridges: 12 µm

Slab height (thickness) $T_{slab}$: 0.2 µm

Length L1 from incidence route to emission route of Mach-Zehnder type optical waveguide: 9.15 mm Length (interaction length) L2 of portion in which electrode and optical waveguide overlap: 5 mm FIG. 27 shows results obtained by performing a light modulation experiment at each wavelength of RGB using the fabricated Mach-Zehnder type optical waveguide.

Figure 27A:
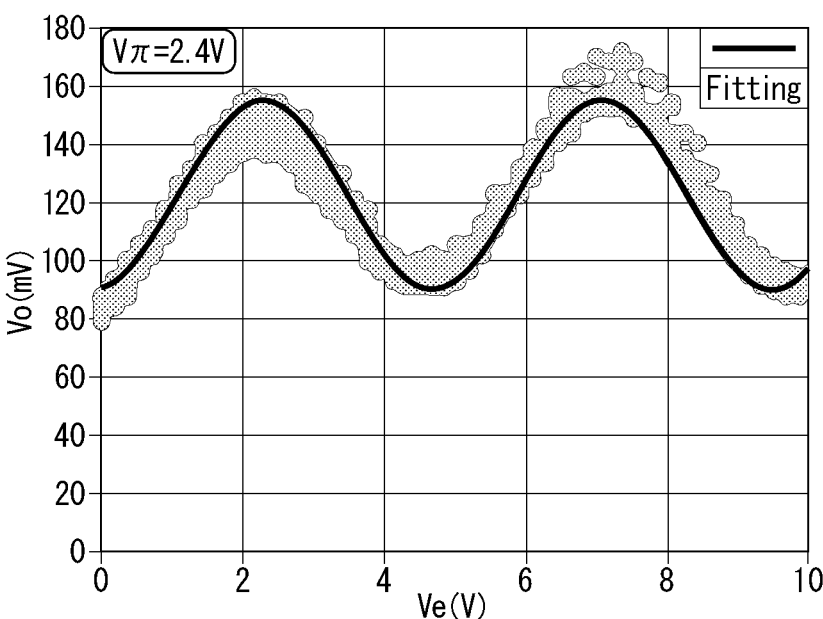
FIGS. 27A, 27B and 27C are graphs showing results obtained by performing a light modulation experiment at each wavelength of RGB using the fabricated Mach-Zehnder type optical waveguide.
Figure 27B:
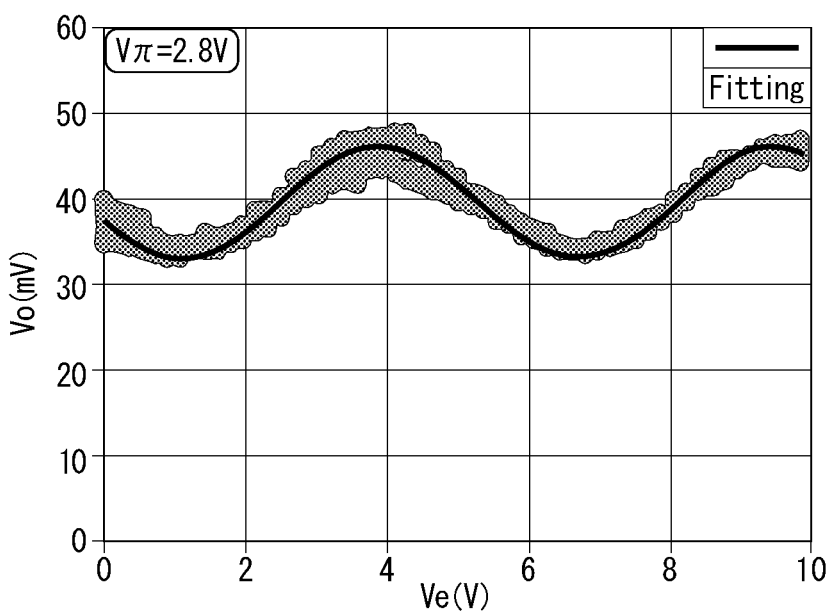
Figure 27C:
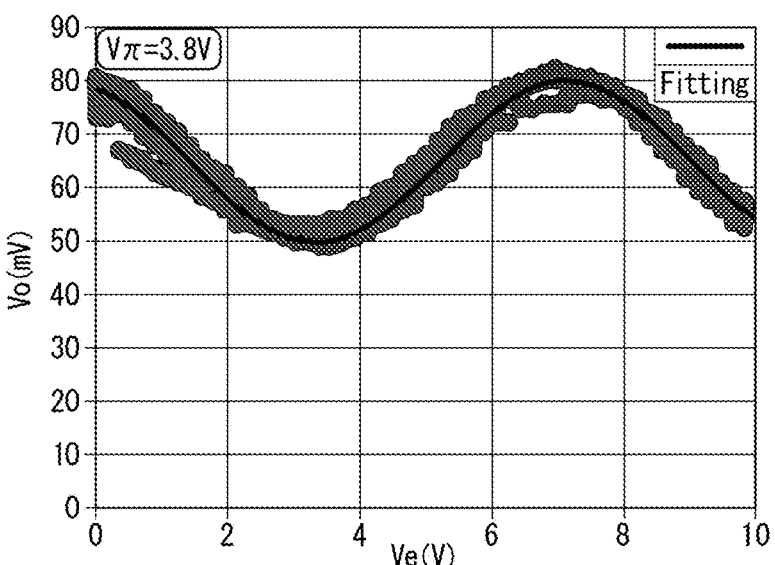

FIGS. 27A, 27B and 27C show light intensities obtained from an emission waveguide by introducing continuous light of a wavelength of 473 nm, a wavelength of 520 nm, and a wavelength of 638 nm from an incidence port of an incidence waveguide 13.

As shown in FIGS. 27A, 27B and 27C, light modulation was confirmed for light with any wavelength. Voltage differences Vπ when a phase difference is zero and a phase difference is π were 2.4 V, 2.8 V and 3.8 V, respectively.

A dimension (length) L1 of the Mach-Zehnder type optical waveguide using the experiment was 9.15 mm as described above. It was confirmed that such a Mach-Zehnder type optical waveguide formed of a small lithium niobate film of 1 cm or less can provide a visible light modulation device that can be driven with low power consumption.

REFERENCE SIGNS LIST

10-1, 10-2, 10-3 Mach-Zehnder type optical waveguide
11, 12 Optical waveguide
30-1, 30-2, 30-3 Optical semiconductor device
50 Multiplexing part
100 Light source part
115 Groove section
200, 300 Light modulation output part
1000, 2000 Visible light modulation device
2001 Optical system
3001 Optical scanning mirror
5001 Optical engine

The invention claimed is:

1. A visible light modulation device, comprising:

a light source part having a plurality of optical semiconductor devices each configured to emit a light with a visible light wavelength of 400 nm to 700 nm so as to emit multiple lights;

a light modulation output part having a plurality of Mach-Zehnder type optical waveguides each consisting of a convex fabricated lithium niobate film, and being configured so that each of the lights emitted from each of the plurality of optical semiconductor devices are incident on a corresponding Mach-Zehnder type optical waveguide; and a controller configured to control a current value input to each of the plurality of optical semiconductor devices such that a peak output of each wavelength of the lights emitted to the outside through the plurality of Mach-Zehnder type optical waveguides has a predetermined color ratio with respect to other lights output by the Mach-Zehnder type optical waveguides.

2. The visible light modulation device according to claim 1, wherein the wavelengths of the lights emitted from the plurality of optical semiconductor devices are all different from each other.

3. The visible light modulation device according to claim 1, wherein each of the Mach-Zehnder type optical waveguides has a curved section.

4. The visible light modulation device according to claim 1, wherein a base on which the plurality of optical semiconductor devices are mounted and a substrate on which the Mach-Zehnder type optical waveguides are formed are directly bonded to each other via a metal layer.

5. The visible light modulation device according to claim 4, wherein a gap is provided between an emission surface from which light is emitted from the optical semiconductor device and an incidence surface of the light modulation output part, and the corresponding optical semiconductor device and the Mach-Zehnder type optical waveguide are positioned such that the light from the optical semiconductor device is emitted from the emission surface, propagates through the gap and enters the Mach-Zehnder type optical waveguide of the incidence surface.

6. The visible light modulation device according to claim 1, wherein the light modulation output part has a multiplexing part configured to multiplex modulation light from the plurality of Mach-Zehnder type optical waveguides.

7. The visible light modulation device according to claim 6, wherein the multiplexing part is any one selected from the group consisting of an MMI type multiplexer, a Y type multiplexer, and a directional coupler.

8. The visible light modulation device according to claim 1, wherein the peak output of each wavelength of the light emitted to the outside through the plurality of Mach-Zehnder type optical waveguides has the same intensity.

9. An optical engine comprising:

the visible light modulation device according to claim 1; and an optical scanning mirror configured to reflect light emitted from the visible light modulation device to display an image by changing an angle thereof.

10. A visible light modulation device, comprising:

a light source part having a plurality of optical semiconductor devices each configured to emit a light with a visible light wavelength of 400 nm to 700 nm so as to emit multiple lights;

a light modulation output part having a plurality of Mach-Zehnder type optical waveguides each consisting of a convex fabricated lithium niobate film, and being configured so that each of the lights emitted from each of the plurality of optical semiconductor devices are incident on a corresponding Mach-Zehnder type optical waveguide; and wherein a current value input to each of the plurality of optical semiconductor devices is a constant value, and the plurality of Mach-Zehnder type optical waveguides are configured such that a peak output of each wavelength of the lights emitted to the outside through the plurality of Mach-Zehnder type optical waveguides has a predetermined color ratio with respect to other lights output by the Mach-Zehnder type optical waveguides.

11. The visible light modulation device according to claim 10, wherein a length of an optical waveguide from an incident end to an output end of the plurality of Mach-Zehnder type optical waveguides is as short as the Mach-Zehnder type optical waveguide through which light with a small wavelength propagates.

12. The visible light modulation device according to claim 10, comprising a light absorption part formed of a material that is absorptive for a wavelength of the light propagating through the optical waveguide from the incident end to the output end of the plurality of Mach-Zehnder type optical waveguides, wherein a length of the optical waveguide of the light absorption part in a length direction is as short as the Mach-Zehnder type optical waveguide through which the light with a small wavelength propagates.

13. The visible light modulation device according to claim 10, comprising a curved part having a curvature provided in the optical waveguide from the incident end to the output end in each of the plurality of Mach-Zehnder type optical waveguides, wherein the Mach-Zehnder type optical waveguide through which the light with a small wavelength propagates has a large curvature or the curved part has a small length.

14. A visible light modulation device, comprising:

a light source part having a plurality of optical semiconductor devices each configured to emit a light with a visible light wavelength of 400 nm to 700 nm so as to emit multiple lights;

a light modulation output part having a plurality of Mach-Zehnder type optical waveguides each consisting of a convex fabricated lithium niobate film, and being configured so that each of the lights emitted from each of the plurality of optical semiconductor devices are incident on a corresponding Mach-Zehnder type optical waveguide; and wherein a current value input to each of the plurality of optical semiconductor devices is a constant value, and a controller configured to control voltages applied to the plurality of Mach-Zehnder type optical waveguides is provided such that a peak output of each wavelength of the lights emitted to the outside through the plurality of Mach-Zehnder type optical waveguides has a predetermined color ratio with respect to other lights output by the Mach-Zehnder type optical waveguides.

15. A visible light modulation device comprising:

a light source part having a plurality of optical semiconductor devices each configured to emit a light with a visible light wavelength of 400 nm to 700 nm so as to emit multiple lights;

a light modulation output part having a plurality of Mach-Zehnder type optical waveguides each consisting of a convex fabricated lithium niobate film and being configured so that each of the lights emitted from each of the plurality of optical semiconductor devices is incident on the corresponding Mach-Zehnder type optical waveguide, and having a multiplexing part configured to multiplex modulation light from the plurality of Mach-Zehnder type optical waveguides; and a controller configured to control a current value input to each of the plurality of optical semiconductor devices such that a peak output of each wavelength of the lights emitted to the outside through the plurality of Mach-Zehnder type optical waveguides has a predetermined color ratio with respect to other lights output by the Mach-Zehnder type optical waveguides.

16. The visible light modulation device according to claim 15, comprising a light absorption layer having a groove section reaching a substrate on which the Mach-Zehnder type optical waveguide is formed from a surface of a device in a portion of the light modulation output part except the Mach-Zehnder type optical waveguide, and provided on at least a bottom surface and side surfaces of the groove section.

17. The visible light modulation device according to claim 16, wherein the plurality of groove sections are formed on one surface of the substrate to be separated from each other.

18. The visible light modulation device according to claim 16, wherein the optical waveguide has a curved section curved from a straight section, and the groove sections are disposed in a manner of intersecting a virtual extension line of the straight section.

19. The visible light modulation device according to claim 16, wherein the optical waveguide has a curved section curved from a straight section, and the groove sections are formed in a manner of being curved and extending along the curved section.

\* \* \* \* \*